United States Patent [19]
Ishiguro et al.

[11] Patent Number: 5,341,268
[45] Date of Patent: Aug. 23, 1994

[54] METHOD OF AND SYSTEM FOR DISCONNECTING FAULTY DISTRIBUTION LINE SECTION FROM POWER DISTRIBUTION LINE

[75] Inventors: Takashi Ishiguro, Niiza; Kazutoyo Narita; Masahide Susuta, both of Tokyo, all of Japan

[73] Assignee: Kabushiki Kaisha Toshiba, Kawasaki, Japan

[21] Appl. No.: 990,294

[22] Filed: Dec. 14, 1992

[30] Foreign Application Priority Data

Dec. 16, 1991 [JP] Japan .................................. 3-352753
Apr. 13, 1992 [JP] Japan .................................. 4-119687

[51] Int. Cl.⁵ .............................................. H02H 7/28
[52] U.S. Cl. ........................................ 361/62; 361/65; 361/66; 361/68; 361/71
[58] Field of Search ..................... 361/68, 67, 71, 62, 361/66, 42, 65

[56] References Cited
FOREIGN PATENT DOCUMENTS
3251041 11/1991 Japan .

Primary Examiner—A. D. Pellinen
Assistant Examiner—S. Jackson
Attorney, Agent, or Firm—Oblon, Spivak, McClelland, Maier & Neustadt

[57] ABSTRACT

A main controller installed in a distribution substation of an electric power system sends a request signal to each of section controllers installed in individual section switches upon detecting a distribution line fault. Each of the section controllers performs fault detection individually. Each section controller judges whether its associated section switch is dividing the distribution line between faulty and normal line sections on the basis of fault detect signals from the other section controllers. If it is judged that its associated section switch is dividing the distribution line between faulty and normal line sections, that section controller opens its associated section switch.

20 Claims, 17 Drawing Sheets

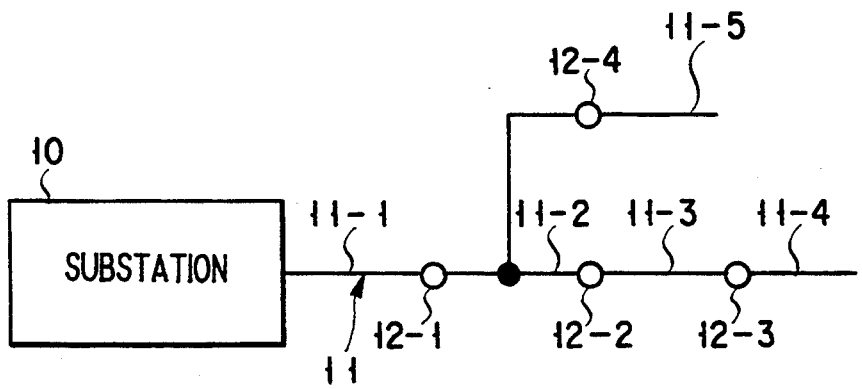
F I G. 1
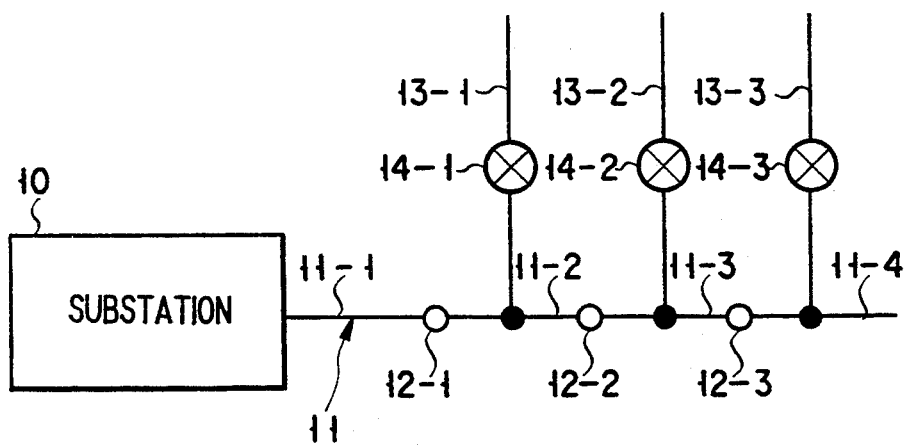
F I G. 2

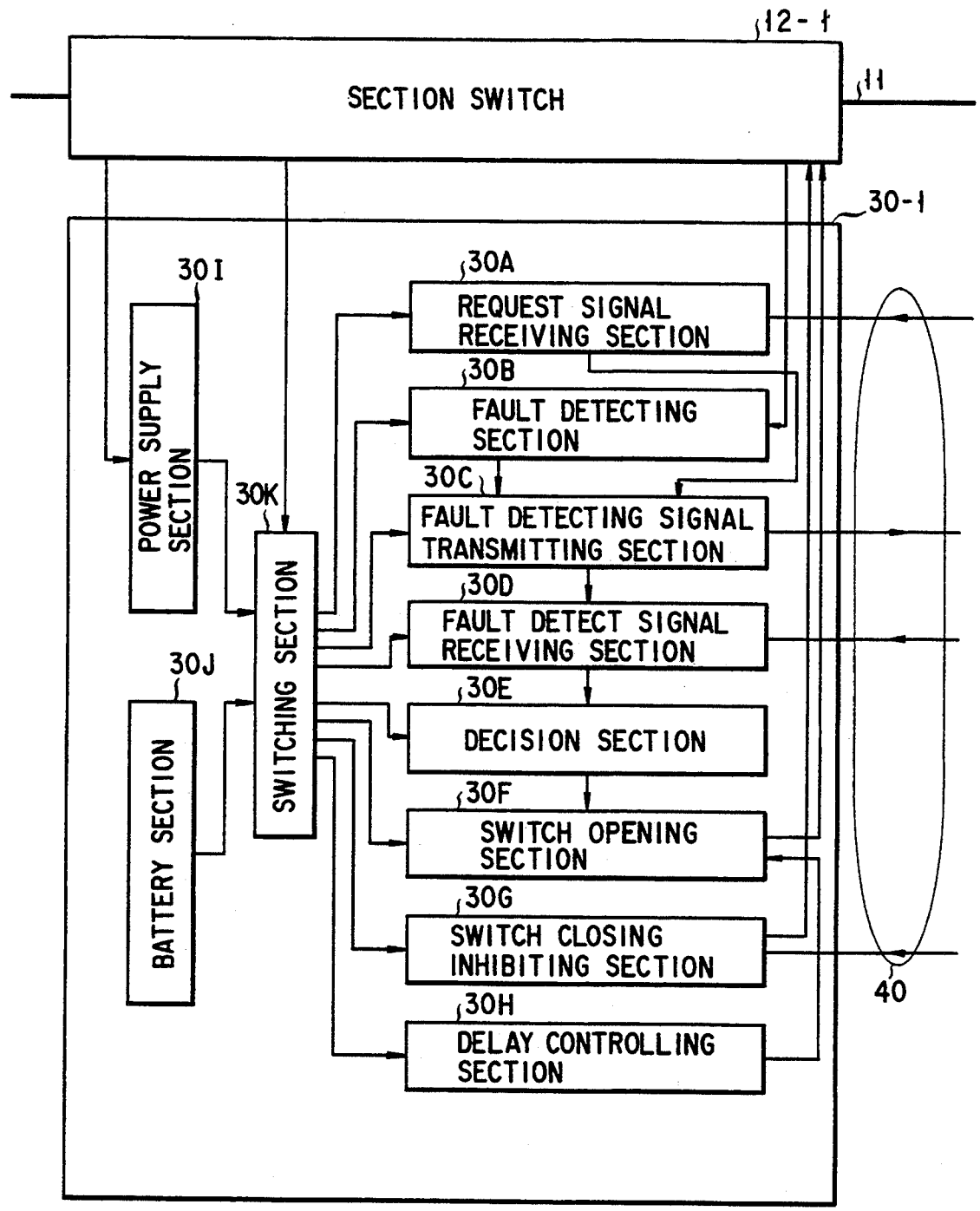
F I G. 6

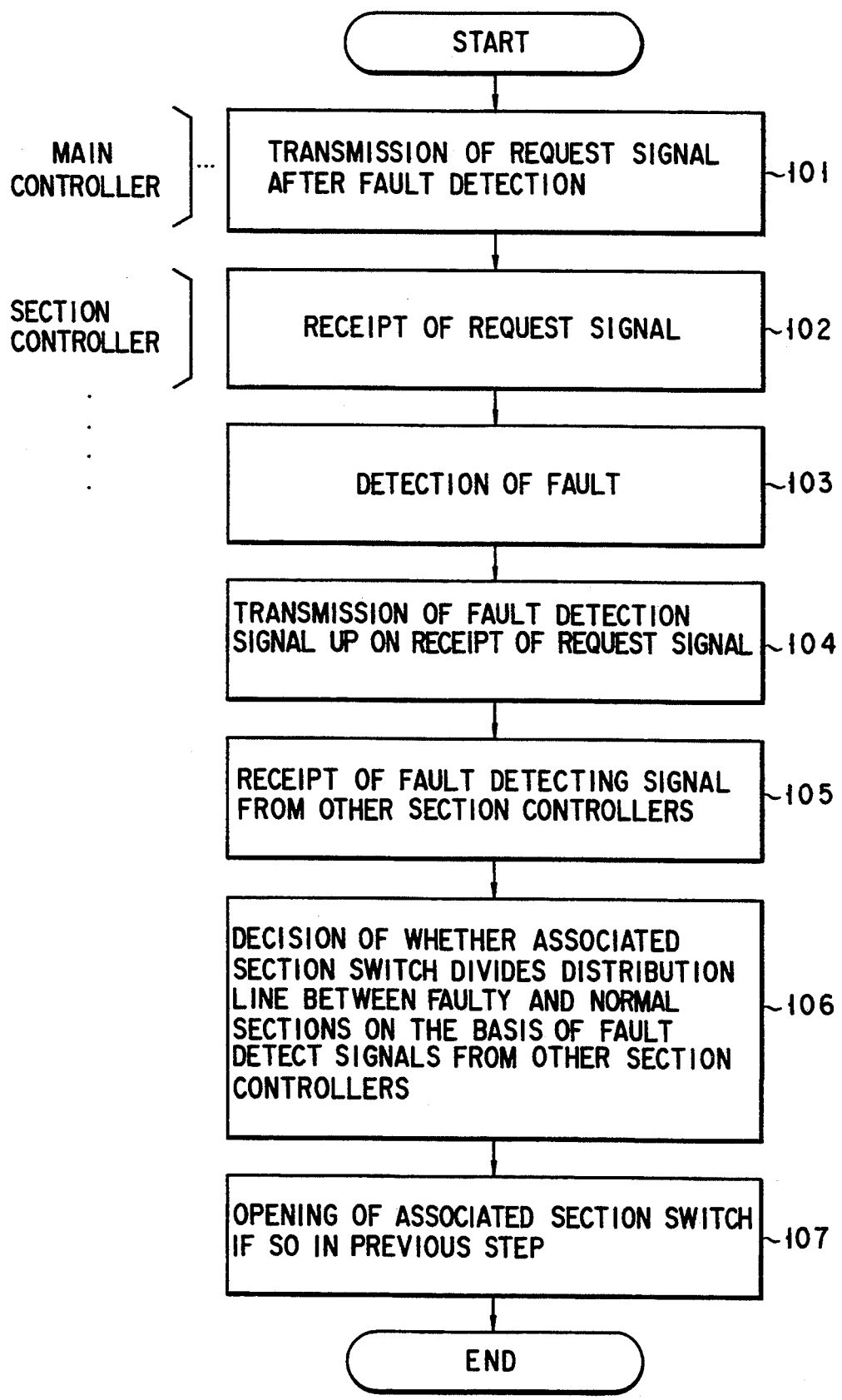
F I G. 7

| SECTION CONTROLLER | SETTING ITEM | | |
|---|---|---|---|
| | TRANSMISSION ORDER | SECTION CONTROLLER ON POWER SUPPLY ORDER | SECTION CONTROLLER ON LOAD SIDE |
| 30-1 | 1 | ——— FAULT | 30-2, 30-4 |
| 30-2 | 2 | 30-1 | 30-3, 30-4 |
| 30-3 | 3 | 30-2 | ——— NON FAULT |
| 30-4 | 4 | 30-1 | 30-2 |

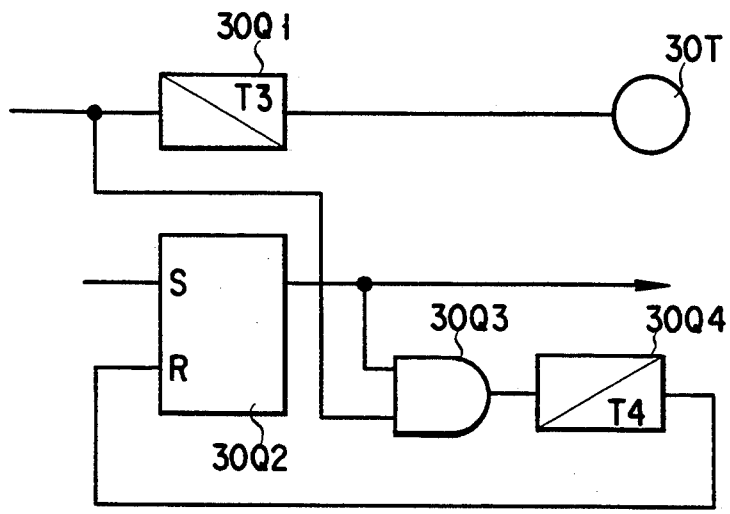
F I G. 12
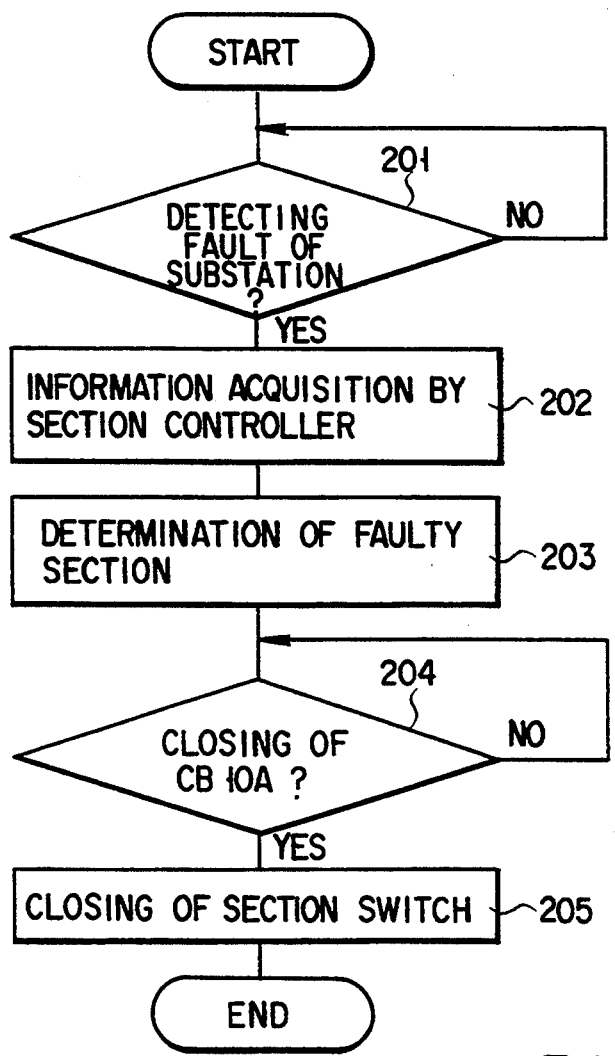
F I G. 13

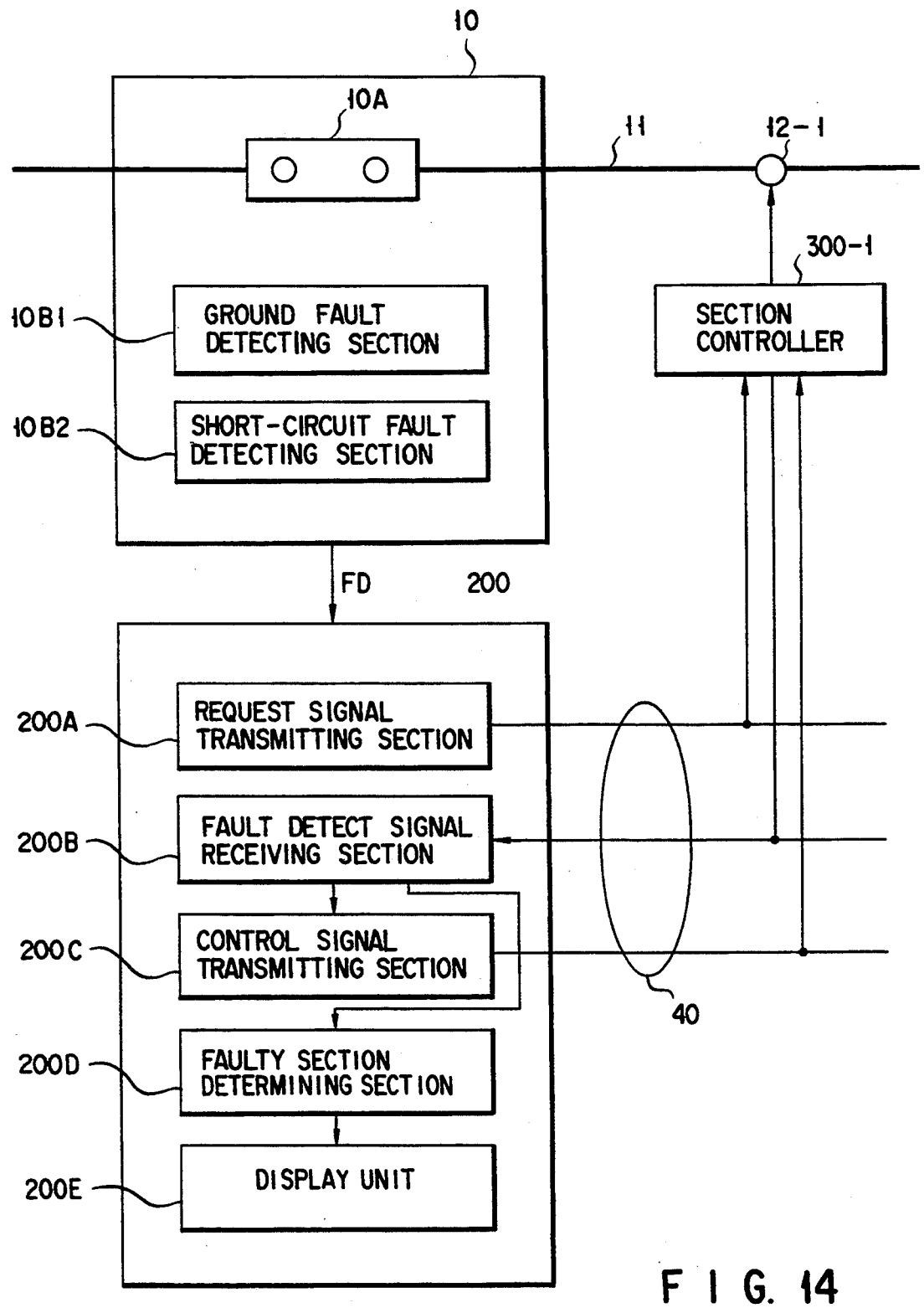
F I G. 14

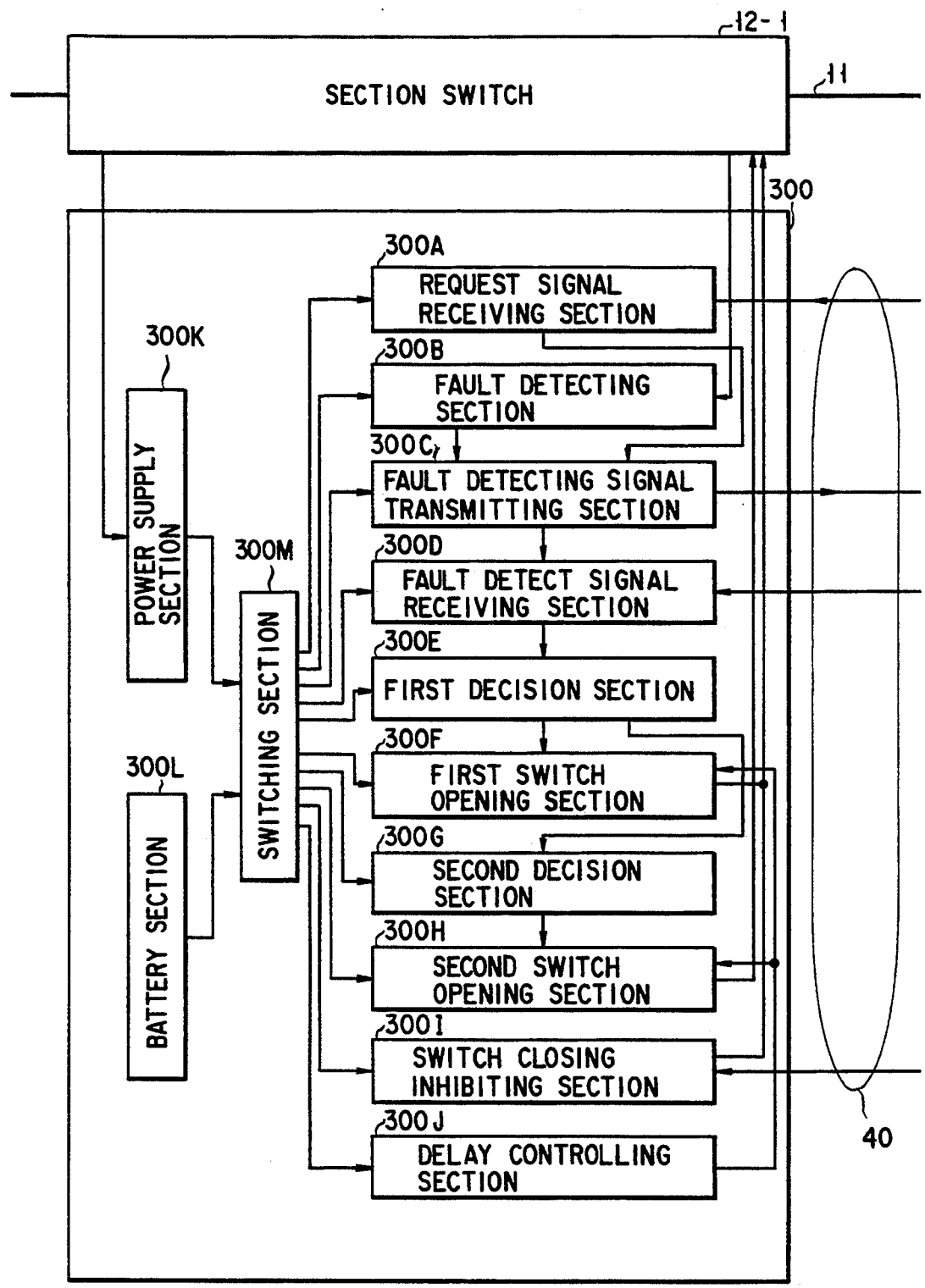
F I G. 15

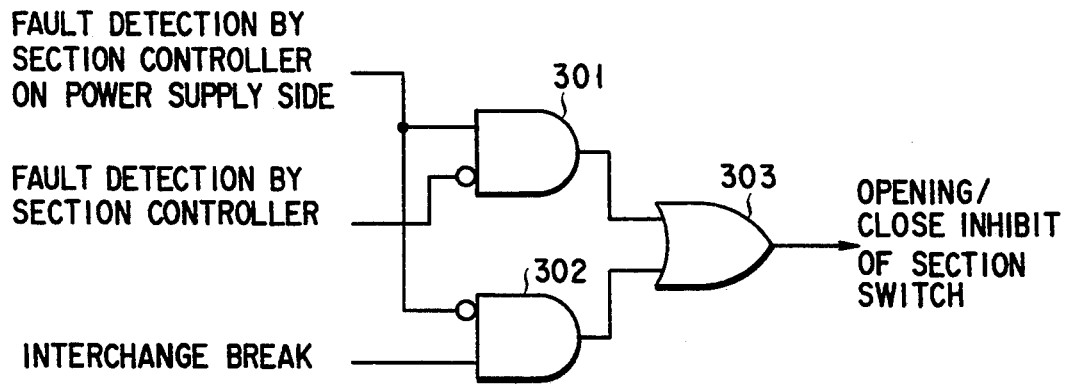
FIG. 18
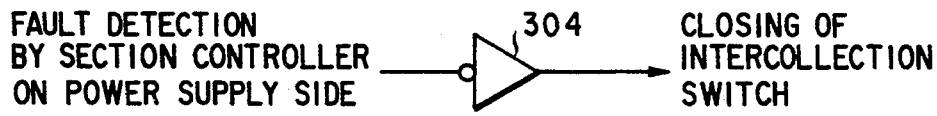
FIG. 19
| CONTROLLER | SETTING ITEM | | | |
|---|---|---|---|---|
| | TRANSMISSION ORDER | SECTION CONTROLLER ON POWER SUPPLY | SECTION CONTROLLER ON LOAD SIDE | INTERCHANGE |
| 300-1 | 1 | — | 300-2 | NO |
| 300-2 | 2 | 300-1 | 300-3 | YES |
| 300-3 | 3 | 300-2 | — | YES |
| 50-1 | — | 300-1 | — | — |
| 50-2 | — | 300-2 | — | — |
| 50-3 | — | 300-3 | — | — |
FIG. 20

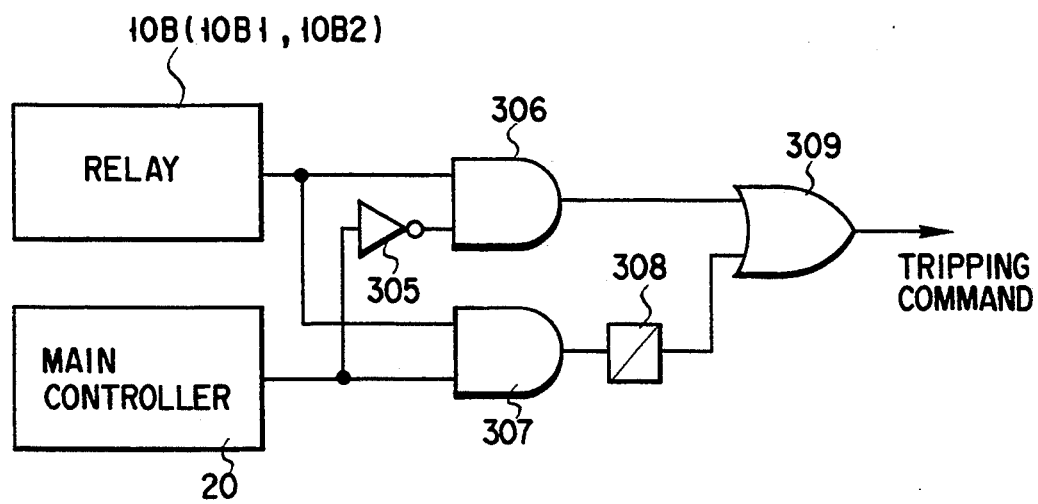
F I G. 21
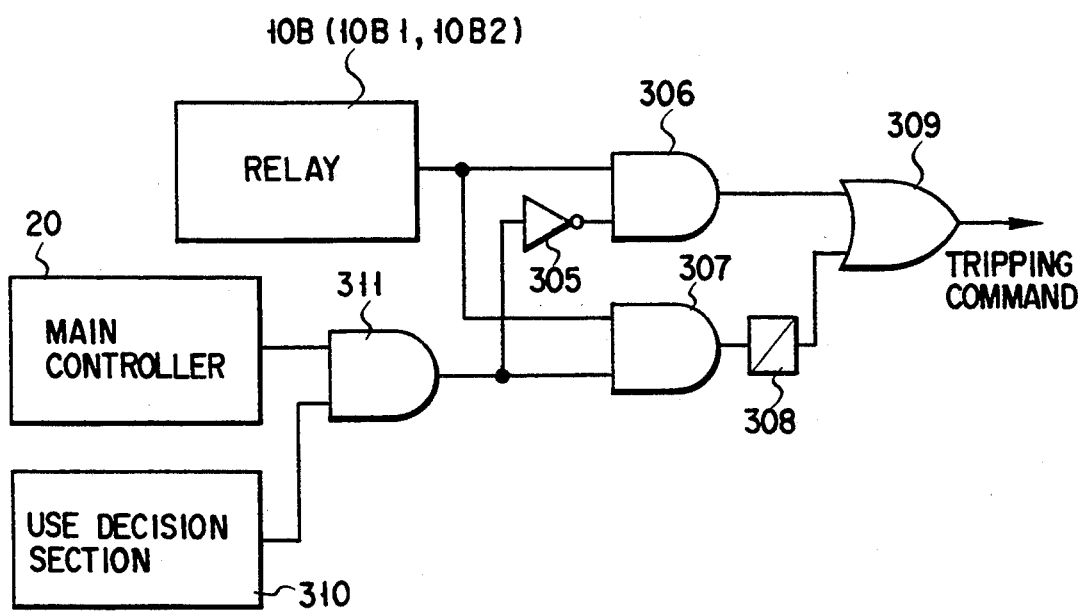
F I G. 22

METHOD OF AND SYSTEM FOR DISCONNECTING FAULTY DISTRIBUTION LINE SECTION FROM POWER DISTRIBUTION LINE

BACKGROUND OF THE INVENTION

1. Field of the Invention

The present invention relates to a method of and system for, when a fault occurs on a distribution system in a power distribution system, disconnecting only a faulty distribution line section from the distribution line.

2. Description of the Related Art

In general, a power distribution system comprises a distribution substation, a distribution line extended from the substation, and a plurality of section switches for dividing the line into a plurality of line sections. In such a power distribution system, it is required to detect a line section on which a fault has occurred and disconnect the faulty line from normal line sections promptly.

To meet such a requirement, various methods and systems have been proposed and put into practice. Heretofore, a typical system includes a main controller installed in the substation, section controllers installed in individual section switches, and a transmission system for connecting the main controller and each section controller.

If a fault, such as a ground fault, occurs in the n-th section of the distribution line, a fault detecting relay in the substation is activated to open a circuit breaker in the substation. All of the section switches are subsequently no-voltage opened, and the circuit breaker is then reclosed. Thereby, the section (first section) from the substation to the first section switch is supplied with electric power. After reclosing of the circuit breaker, the first section switch, counting from the substation, is closed when its section controller decides that a line section on the substation side (substation side station) are normal. The same operation is repeated up to the n-th section switch.

However, when the substation-side section (load-side section) of the n-th section switch is a faulty section, if the section switch corresponding to the faulty section is closed, the fault detection relay of the station is operated and the circuit breaker is tripped once again. By this breaking operation, the section controller of the n-th section switch determines that the n+1-th section is a faulty section. When the circuit breaker is closed once again, the section switches, up to the n+1-th section switch, are successively closed, and electric power is supplied to the sections just before the faulty section. Thus, power is stopped only in the faulty section.

With such a method, power supply will be cut off in the whole power distribution system. After the power supply to the whole power distribution system is stopped temporarily, the sections are sequentially searched for a fault, beginning with the section closest to the substation. This requires a lot of time.

SUMMARY OF THE INVENTION

It is therefore a first object of the present invention to provide a method of making the power-supply stopped section and the stoppage time as short as possible when a fault occurs on a distribution line of a power distribution system.

It is a second object of the present invention to provide a system for making the power-supply stopped section and the stoppage time as short as possible when a fault occurs on a distribution line of a power distribution system.

It is a third object of the present invention to provide a system for making the power-supply stopped section and the stoppage time as short as possible when a fault occurs on a distribution line of a power distribution system.

The first object of the present invention is attained by a method, which is used with an electric power system including a main controller installed in a distribution substation having a circuit breaker and distribution line fault detecting means, a plurality of section controllers installed in section switches which divide a distribution line drawn out from the distribution substation into a plurality of line sections, and a transmission system for signal transmission between the main controller and the section controllers, carrying out control for, when a fault occurs on the distribution line, disconnecting only a faulty line section from the distribution line, comprising:

the first step of transmitting a request signal from the main controller to the transmission system when the distribution line fault detecting means detects a fault on the distribution line;

the second step of receiving the request signal transmitted from the main controller over the transmission system by the section controllers;

the third step of detecting the fault by the section controllers;

the fourth step of transmitting to the transmission system fault detect signals indicated a fault and non fault from the section controllers which have received the request signal in the second step and performed the third step;

the fifth step of, by each of the section controllers, receiving the fault detect signals transmitted from other section controllers over the transmission system;

the sixth step of, by each of the section controllers, Judging whether or not its associated section switch divides the distribution line between faulty and normal line sections on the basis of the fault detect signals received from the other section controllers in the fifth step; and the seventh step of, by each of the section controllers, opening its associated section switch when it is Judged in the sixth step that its associated section switch is dividing the distribution line between faulty and normal line sections.

The second object is attained by an electric power system including a main controller installed in a distribution substation having a circuit breaker and distribution line fault detecting means, a plurality of section controllers installed in their associated section switches which divide a distribution line drawn out from the distribution substation into a plurality of line sections, and a transmission system for signal transmission between the main controller and the section controllers, the main controller including first means for transmitting a request signal onto the transmission system when the distribution line fault detecting means detects a fault on the distribution line, and each of the section controllers including:

second means for receiving the request signal transmitted from the main controller over the transmission system;

third means for detecting a fault on the distribution line;

fourth means for transmitting to the transmission system a fault detect signal indicated a fault and non fault when the request signal is received by the second means and the third means is performed;

fifth means for receiving the fault detect signals transmitted from other section controllers over the transmission system;

sixth means for judging whether or not its associated section switch divides the distribution line between faulty and normal line sections on the basis of the fault detect signals from the other section controllers received by the fifth means; and seventh means for opening its associated section switch when it is judged by the sixth means that its associated section switch is dividing the distribution line between faulty and normal line sections.

The third object is attained by an electric power system including a main controller installed in a distribution substation having a circuit breaker, distribution line ground fault detecting means and distribution line short-circuit fault detecting means, a plurality of section controllers installed in their associated respective section switches which divide a distribution line drawn out from the distribution substation into a plurality of line sections, at least one interconnection controller installed in its associated interconnection switch for interconnecting an interconnection distribution line to the distribution line, and a transmission system for signal transmission among the main controller, the section controllers and the interconnection controller, the main controller including first means for transmitting a request signal onto the transmission system when at least one of the distribution line ground fault detecting means and the distribution line shortcircuit fault detecting means detects a fault on the distribution line, each of the section controllers including:

second means for receiving the request signal transmitted from the main controller over the transmission system;

third means for detecting a fault on the distribution line;

fourth means for transmitting to the transmission system a fault detect signal indicated a fault and non fault when the request signal is received by the second means and the third means is performed;

fifth means for receiving the fault detect signals transmitted from other section controllers over the transmission system;

sixth means for judging whether or not its associated section switch divides the distribution line between faulty and normal line sections on the basis of the fault detect signals from the other section controllers received by the fifth means;

seventh means for opening its associated section switch when it is judged by the sixth means that its associated section switch is dividing the distribution line between faulty and normal line sections;

eighth means responsive to the fault detect signals from the other section controllers received by the fifth means for judging whether or not its associated section switch is located down the fault line section; and ninth means for keeping its associated section switch open or closed when the eighth means Judges that its associated section switch is located down the faulty line section of the distribution line, and the interconnection section controller including:

tenth means for the fault detect signals transmitted from the section controllers over the transmission system;

eleventh means responsive to the fault detect signals received by the tenth means for judging whether or not its associated interconnection switch is interconnected to a non-faulty line section is located down the fault line section of the distribution line; and twelfth means for closing its associated interconnection switch when the eleventh means judges that its associated interconnection switch is interconnected to a non-faulty line section is located down the fault line section of the distribution line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 illustrates an example of a power distribution system to which the present invention is applied;

FIG. 2 illustrates a second example of a power distribution system to which the present invention is applied;

FIG. 6 is a block diagram of the section controller in FIG. 3;

FIG. 7 is a flowchart illustrating the system flow in the control system of FIG. 3;

FIG. 12 is a logic diagram for fault detect signal transmission and battery control in FIG. 11;

FIG. 13 is a flowchart illustrating for the system flow in FIG. 11;

FIG. 14 is a block diagram of the main controller in the control system of FIG. 4;

FIG. 15 is a block diagram of the section controller in the control system of Fig.

FIG. 18 is a decision logic diagram of another example of the section controller in the present invention;

FIG. 19 is a diagram illustrating setting conditions of an example of the interconnection controller in the present invention;

FIG. 20 is a decision logic diagram of the section controller and the interconnection controller in the present invention;

FIG. 21 is a logic diagram of the main portion of the main controller;

FIG. 22 is another logic diagram of the main portion of the main controller.

DETAILED DESCRIPTION OF THE PREFERRED EMBODIMENTS

First, power distribution systems to which the present invention is applied will be described with reference to FIGS. 1 and 2. A power distribution system shown in FIG. 1 is a noninterconnected power distribution system. The power distribution system comprises a distribution substation 10, a distribution line 11 extended from the substation 10, and a plurality of section switches 12-1, 12-2, 12-3 and 12-4. These section switches divide the distribution line 11 into sections 1-1, 11-2, 11-3, 11-4 and 11-5.

The power distribution system shown in FIG. 2 is an interconnected power distribution system, which comprises a distribution substation 10, a distribution line 11 extended from the substation, a plurality of section switches 12-1, 12-2 and 12-3, a plurality of interconnection lines 13-1, 13-2 and 13-3, and a plurality of interconnection switches 14-1, 14-2 and 14-3 for interconnecting the interconnection lines to the distribution line 11. Note that the distribution substation 10 is equipped with at least a circuit breaker and a distribution line fault detecting section not shown.

Figure 3:
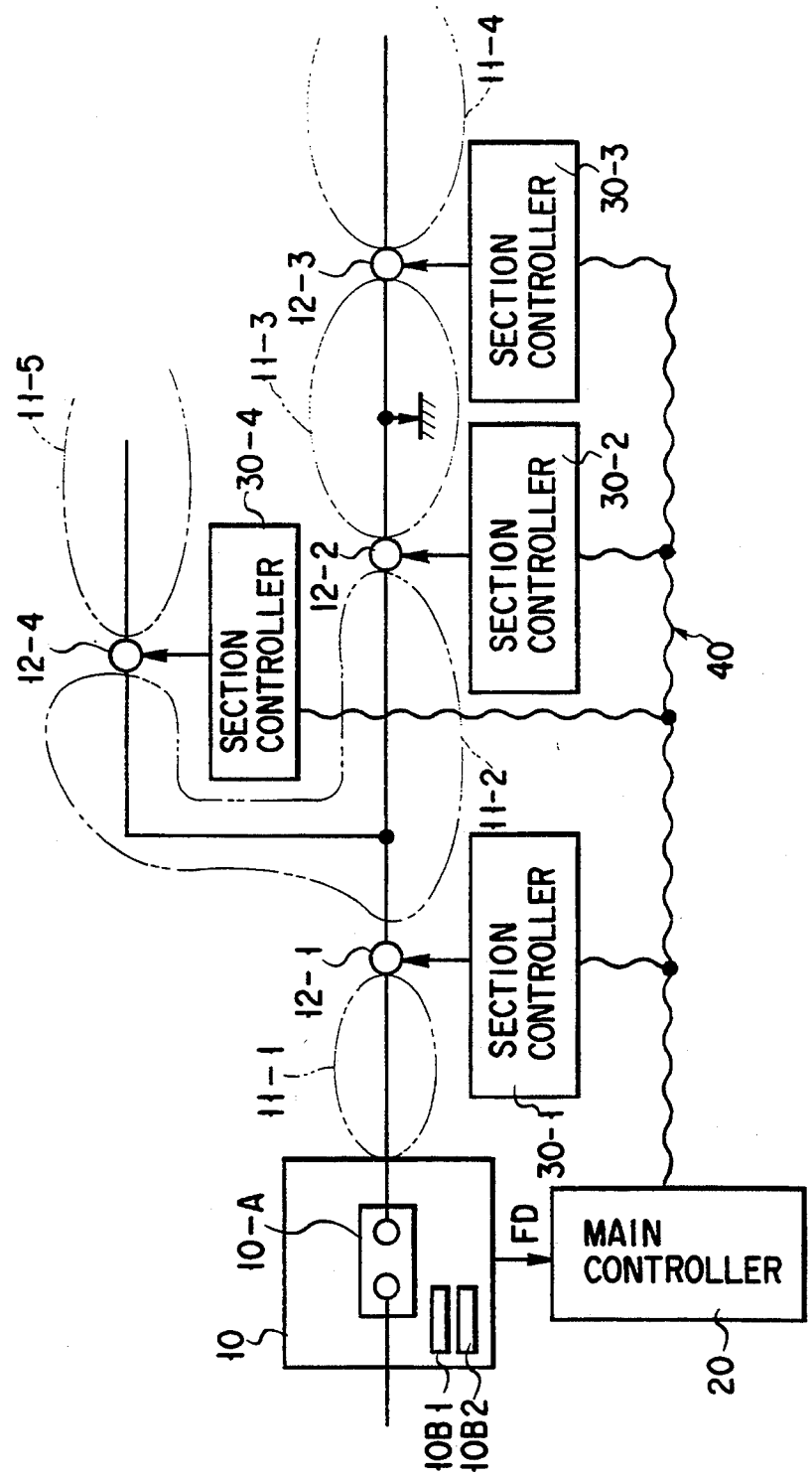
FIG. 3 illustrates an example of a control system of the present invention used in the system shown in FIG. 1.

A control system of the present invention is installed in the noninterconnected power distribution system shown in FIG. 1. The control system, as shown in FIG. 3, has a main controller 20 installed in the distribution substation 10, a plurality of section controllers 30-1, 30-2, 30-3, and 30-4 installed in the individual section switches 12-1, 12-2, 12-3 and 12-4, and a transmission system 40 for transmitting signals between the main controller 20 and each of the section controllers 30-1 to 30-4. When a fault, such as grounding or short-circuiting, occurs on the distribution line 11, the control system carries out control for disconnecting only a section in which the fault has occurred from the distribution line 11. Note that the distribution substation 10 has at least a circuit breaker 10A, a ground-fault detecting section 10B1 and a short-circuit fault detecting section 10B2.

Figure 4:
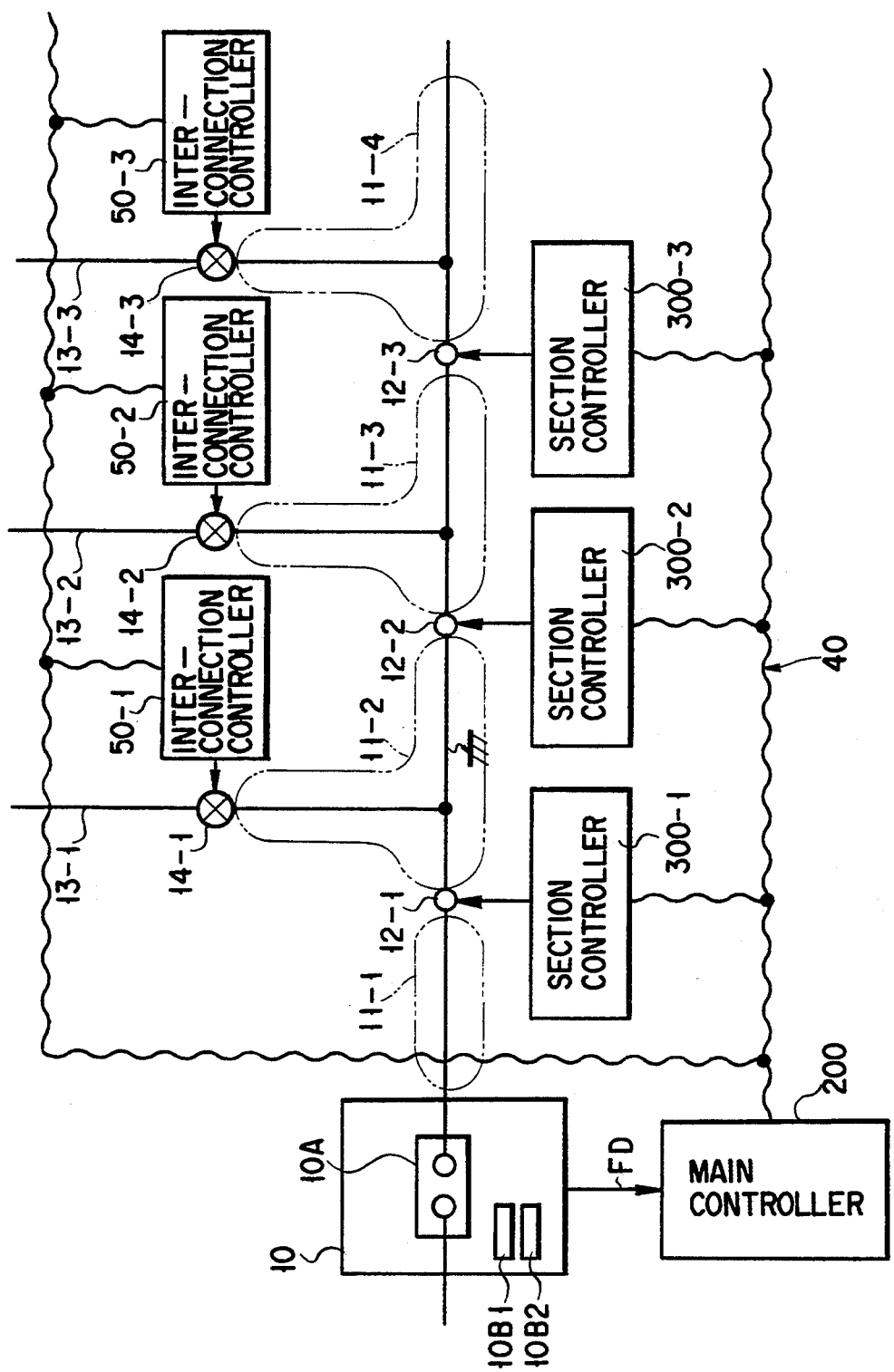
FIG. 4 illustrates an example of a control system used in the system shown in FIG. 2.

Another control system of the present invention is installed in the interconnected power distribution system shown in FIG. 2. The control system, as shown in FIG. 4, has a main controller 200 installed in the distribution substation 10, a plurality of section controllers 300-1, 300-2, and 300-3 installed in the individual section switches 12-1, 12-2 and 12-3, a plurality of interconnection controllers 50-1, 50-2 and 50-3 installed in the individual interconnection switches 14-1, 14-2 and 14-3, and a transmission system 40 for signal transmission among the main controller 20, the section controllers 30-1 to 30-4 and the interconnection controllers 5-1 to 50-3. When a fault, such as grounding or short-circuiting, occurs on the distribution line 11, the control system carries out control for disconnecting only a faulty section from the distribution line 11 and interconnecting an interconnection distribution line to the distribution line. Note that the distribution substation 10 shown in FIGS. 1 through 4 has at least a circuit breaker 10A, a ground-fault detecting section 10B1 and a short-circuit fault detecting section 10B2.

The control system shown in FIG. 3 will be described.

Upon detecting a fault on the distribution line 11, the ground-fault detection section 10B1 and the shortcircuit-fault detecting section 10B2 in the distribution substation 10 transmit a fault detect signal FD to the main controller 20.

Figure 5:
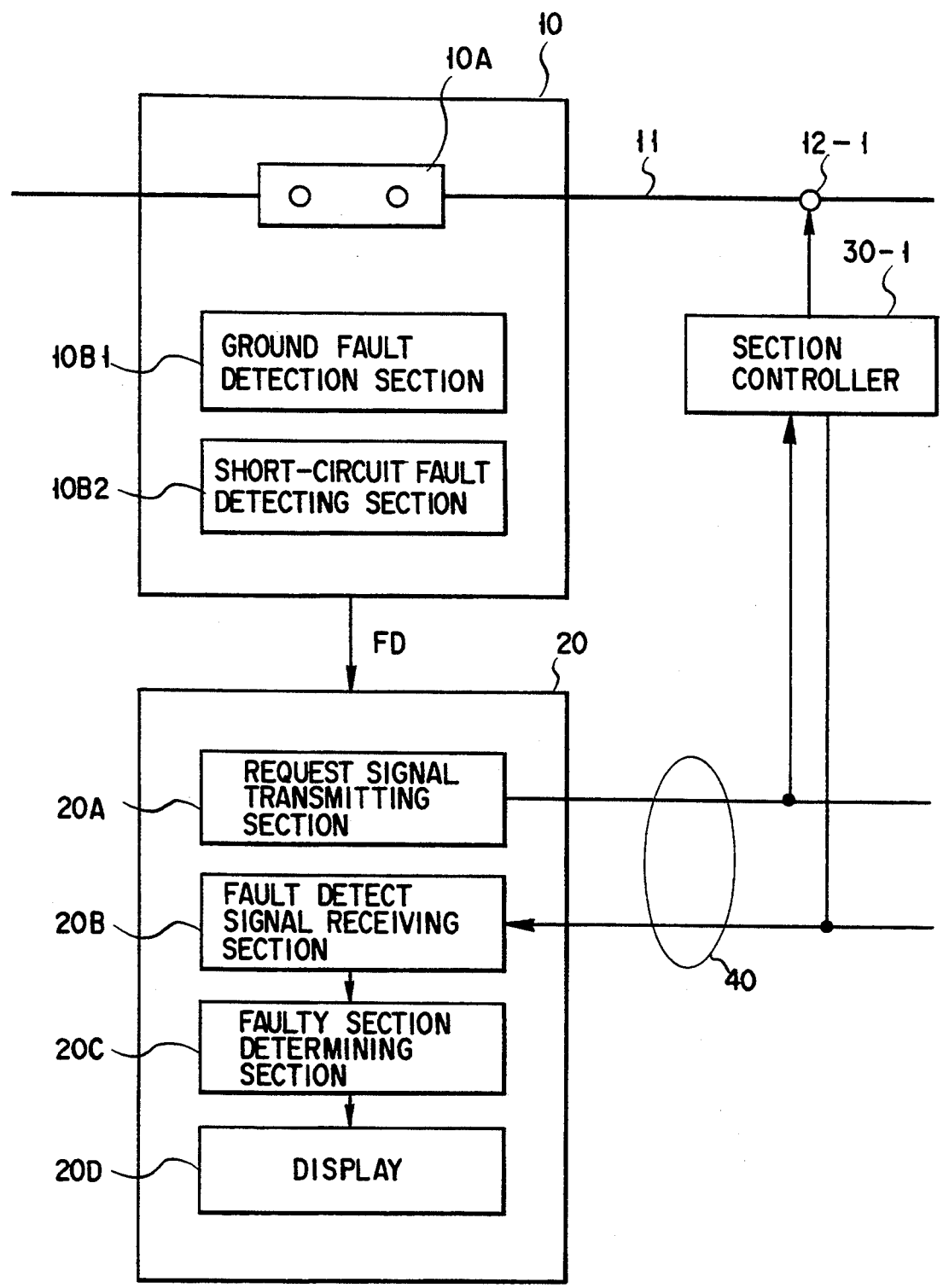
FIG. 5 is a block diagram of the main controller in FIG. 3.

As shown in FIG. 5, the main controller 20 includes a request signal transmitting section 20A, a fault detect signal receiving section 20B, a faulty section determining section 20C, and a display unit 20D.

Upon receipt of the fault detect signal FD from the substation 10, the request signal transmitting section 20A sends a request signal onto the transmission system 40. The request signal is generally sent to each of the section controllers 30-1, 30-2, 30-3 and 30-4 simultaneously. The fault detect signal receiving section 20B receives a fault detect signal transmitted from each of the section controllers over the transmission system 40. The faulty section determining section 20C determines one of the section switches 12-2 and 12-3 that divides the distribution line between faulty and normal sections on the basis of fault detect signals from the section controllers. Information about one of the section switches 12-2 and 12-3 or the faulty section 11-3 that has been determined by the faulty section determining section 20C is displayed visually or printed in hard copy form by the display unit 20D. Fault detect signals from the section controllers 30-1, 30-2, 30-3 and 30-4 are sequentially sent to the main controller 20 in a predetermined time sequence. That is, a request signal is transmitted from the main controller 20 to the section controllers 30-1, 30-2, 30-3 and 30-4 simultaneously, and consequently fault detect signals are sequentially transmitted from the section controllers to the main controller 20 at predetermined times. Alternatively, the main controller 20 may send a request signal to the section controllers in accordance with a predetermined polling sequence, and the section controllers may send fault detect signals to the main controller sequentially in accordance with the predetermined polling sequence.

The section controllers 30-1, 30-2, 30-3 and 30-4 are identical to one another in arrangement. Thus, the section controller 30-1 will be described typically with reference to FIG. 6. The section controller 30-1 includes at least a request signal receiving section 30A, a fault detecting section 30B, a fault detect signal transmitting section 30C, a fault detect signal receiving section 30D, a decision section 30E, a switch opening section 30F, a switch closing inhibiting section 30G, a delay control section 30H, a power supply 30I, a battery 30J, and a switching section 30K.

The request signal receiving section 30A receives request signal transmitted from the main controller 20 over the transmission system 40. The fault detecting section 30B detects a fault on the distribution line 11. The detection of a fault by the fault detecting section 30B may be achieved by detecting the presence or absence of voltages at both terminals of the section switch 12-1, i.e., a voltage on the side of the substation and a voltage on the side of the load. The fault detect signal transmitting section 30C receives a request signal and sends a fault detect signal to the transmission system 40 when the fault detecting section 30B detects a fault. The fault detect signal receiving section 30D receives a fault detect signal transmitted from each of the other section controllers 30-2, 30-3 and 30-4 over the transmission system 40. The decision section 30E, on the basis of fault detect signals from the other section controllers 30-2 to 30-3, decides whether or not its associated section switch 12-1 divides the distribution line 11 between faulty and normal sections. When the decision section 30E decides that the associated section switch 12-1 divides the distribution line between faulty and normal sections, the switch opening section 30F issues an opening command to the section switch 12-1 to open it. The closing inhibiting section 30G inhibits the section switch 12-1 that has been opened from being closed until it receives a command to cancel the closing inhibit from outside. The delay control section 30H controls the opening operation of the switch opening section 30F by priority so as to open the section switch 12-1 before the circuit breaker 10A in the substation 10 opens. The delay control section 30H is realized by setting the operation speed of the switch opening section 30F and adjusting the sensitivity of the circuit breaker 10A. The power supply section 30I regulates electric power from the distribution line 11 to a control voltage, which, in turn, is applied to the request signal receiving section 30A, the fault detecting section 30B, the fault detect signal transmitting section 30C, the fault detect signal receiving section 30D, the decision section 30E, and the switch opening section 30F through the switching section 30K. The battery section 30J, which is substituted for the power supply section 30I, converts alternating current power from the distribution line 11 into direct current, by which it is charged. The switching section 30K switches between the power supply section 30I and the battery section 30J to apply the control voltage to the various sections described above. When the section that is associated with the section switch 12-1 is faulty, the battery section 30J is substituted for the power supply section 30I for application of the control voltage. The battery section is charged constantly or regularly.

The control system arranged as described above operates in accordance with the flow of control shown in FIG. 7. The flow of control comprises a first step 101 carried out by the main controller 20, and second through seventh steps 102 through 107 carried out by each of the section controllers 30-1 to 30-4. Hereinafter, a description will made of the operation of the present control system when a fault occurs in the section 11-3.

In first step 101, when the ground fault detecting section 10B1 or the short-circuit fault detecting section 10B2 detects a fault on the distribution line 11, the request signal transmitting section 20A sends a request signal to each of the section controllers 30-1 through 30-4 via the transmission system 40.

Steps 102 through 107 are carried out by each of the section controllers 30-1 through 30-4. In step 102, the request signal receiving section 30A in each of the section controllers 30-1 to 30-4 receives the request signal via the transmission system 40. In step 103, the fault detecting section 30B in each of the section controllers 30-1 to 30-4 performs fault detection independently. In step 104, when the request signal is received in step 102 and the fault is detected in step 103, the fault detect signal transmitting section 30C in each of the section controllers 30-1 to 30-4 transmits a fault detect signal on the transmission system 40. In step 105, the fault detect signal receiving section 30D in the section controller 30-1 receives the fault detect signals transmitted by the other section controllers 30-2, 30-3 and 30-4 over the transmission system 40. At this point, the fault detect signal receiving section 30D in the section controller 30-2 receives fault detect signals from the other section controllers 30-1, 30-3 and 30-4 via the transmission system 40. Likewise, the fault detect signal receiving section 30D in the section controller 30-2 receives fault detect signals from the other section controllers 30-1, 30-3 and 30-4 via the transmission system 40, and the fault detect signal receiving section 30D in the section controller 30-4 receives fault detect signals from the other section controllers 30-1, 30-2 and 30-3 via the transmission system 40. In step 106, the decision section 30E in each of the section controllers 30-1 to 30-4 makes a decision as to whether or not its associated section switch divides the distribution line between faulty and normal sections on the basis of the fault detect signals received from the other section controllers in step 105. In step 107, the switch opening section 30F in each of the section controllers 30-1 to 30-4 issues an opening command to its associated section switches 30-2 and 30-3 so as to open it when it is decided in step 106 that its associated section switch divides 12-2 and 12-3 the distribution line between faulty and normal sections.

Figure 8:
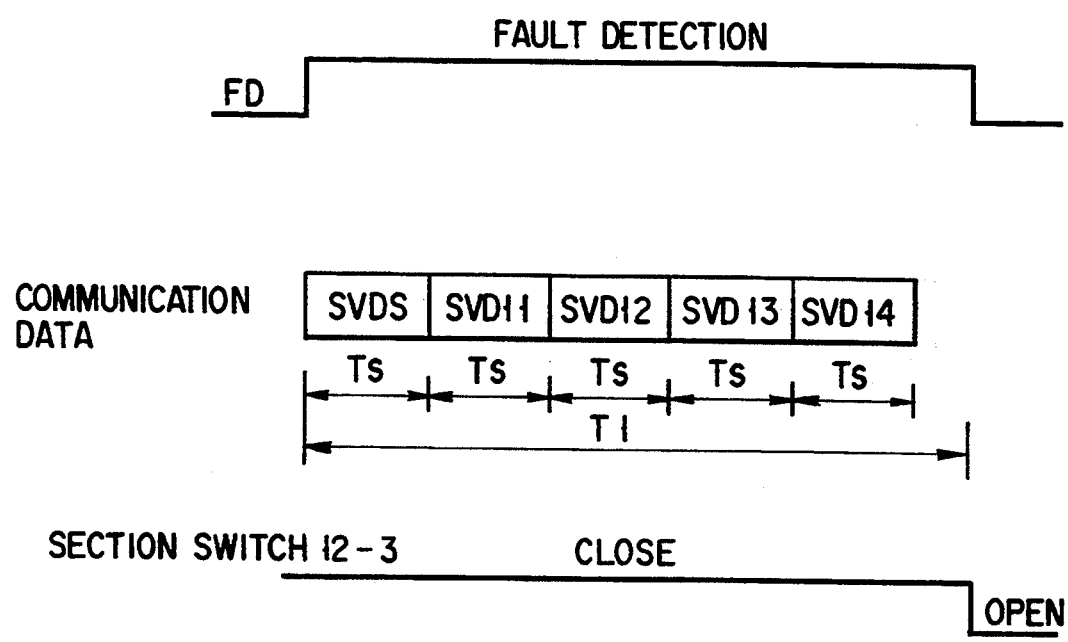
FIG. 8 is a timing chart of an example of data transmission in the present invention.

Next, reference will be made to FIG. 8 to describe an example of signal transmission between the main controller 20 and each of the section controllers 30-1 to 30-4. The main controller 20 continually monitors the fault detect signal FD from the substation 10. Upon receipt of the signal FD, the main controller 20 sends a request signal SVDS simultaneously to each of the section controllers 30-1 to 30-4. The section controllers 30-1 to 30-4 have a capability of detecting a fault on the load side simultaneously with or more promptly than the substation 10. Each of the section controllers 30-1 to 30-4 opens its associated section switch and stores "closing inhibit" when it decides that its associated section switch divides the distribution line between faulty and normal sections. The section controller is arranged not to close its associated section switch, once opened, until the closing inhibit is canceled. The section controllers 30-1 to 30-4 are arranged to transmit their respective fault detect signals SVD11 to SVD14 at time intervals of Ts in the order of their numbers, 30-1, 30-2, 30-3 and 30-4, as shown in FIG. 8.

Figures 9, 10:
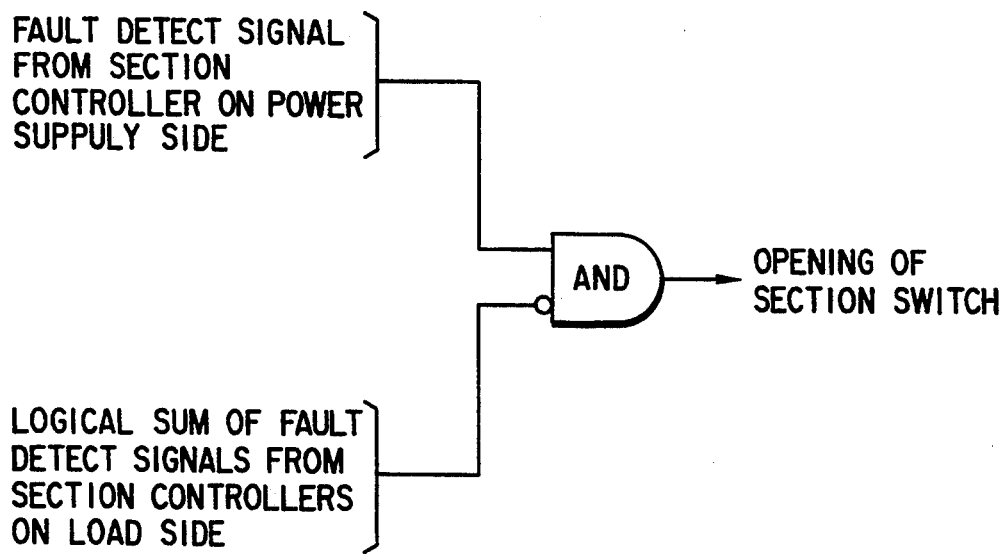
FIG. 9 is a decision logic diagram of the section controller.
FIG. 10 is a diagram for use in explanation of setting conditions of the section controller.

The decision of a faulty section by the section controller is made using logic shown in FIG. 9. If, in this case, there is no section controller on the side of the power supply, the decision is made under the condition that there is fault detection on the side of the power supply. If, on the other hand, there is no section controller on the side of the load, the decision is made under the condition that there is no fault detection on the load side. The time T1 that elapses from transmission of a request signal from the main controller 20 to the time when the section switch associated with a faulty section is opened after the termination of transmission of fault detect signals from all the section controllers is selected to be shorter than the time T2 that elapses from when the substation 0 detects a fault to the time when the circuit breaker 10A opens.

Next, the operation will be described mainly with reference to FIG. 10. It is assumed here that the section switches 12-1 to 12-4 are in the closed state in which electric power is supplied from the substation 10 to the load.

If, in this state, a fault occurs in the section 11-3, the section controllers 30-1 and 30-2 performs fault detection because the fault has occurred on the load side. The other section controllers 30-3 and 30-4 performs no fault detection because the fault has occurred on the power supply side.

The substation 10 also detects the fault on the load side and issues a fault detect signal FD to the main controller 20. Upon receipt of the fault detect signal FD from the substation 10, the main controller 20 transmits a request signal SVDS simultaneously to each of the section controllers 30-1 to 30-4. After receipt of the request signal SVDS, the section controllers 30-1 to 30-4 sequentially transmit fault detect signals SVD11 to SVD14 to the main controller 20 at time intervals of Ts (refer to FIG. 8).

Each of the section controllers 30-1 to 30-4 makes a faulty section decision on the basis of the logic shown in FIG. 9 supplied with fault detect signals from the other section controllers, thereby controlling its associated section switch. That is, the section controller 30-1 continues closing of its associated section switch 12-1 because the section controller 30-2 on the load side has detected the fault. The section controller 30-1 opens its associated section switch 12-2 and stores "closing inhibit" because the fault is detected by the section controller 30-1 on the power supply side but not detected by the section controllers 30-3 and 30-4. The section controller 30-3 opens its associated section switch 12-3 and stores "closing inhibit" because the section controller 30-2 on the power supply side has detected the fault. The section controller 30-4 continues closing of its associated section switch 12-4 because both of the section controller 30-1 on the power supply side and the section controller 30-2 on the load side have detected the fault. Note that, even if the section switch 12-3 is supplied with electric power from the load side, it will not be closed because the section controller 30-3 stores "closing inhibit".

As described above, the present invention can provide a high-quality power supply system which disconnects only a faulty line section from a distribution line and continues power supply to a normal line section or sections on the power supply side of the faulty line section. In addition, stress imposed on pieces of equipment in a power distribution system will be reduced.

The above embodiment is described as opening the section switch associated with a faulty line section to disconnect the faulty line section. In a system in which the interrupting capacity of section switches is too small to interrupt short-circuit current, the following operations may be performed by communicating signals via the transmission system after a faulty line decision has been made.

Though section controllers which have made a faulty section decision will open their associated section switches, only a section controller on the power supply side of the faulty section does not open its associated section switch but stores only "closing inhibit" on the condition that the fault detected is a short-circuit fault. The section switches will be opened after the system voltage is made zero by circuit breaker being tripped in the substation. When the circuit breaker in the substation is closed again, normal-section line controllers sequentially closes their associated section switches using their conventional time-closing function. The controller on the power supply side of the faulty section will not time-close its associated section switch because it has stored "closing inhibit" as described above. In this case, power supply to the normal sections on the power supply side of the faulty section will be stopped once by circuit-breaker tripping in the substation for disconnection of the faulty section. In comparison with a conventional system in which power supply is stopped twice, however, the present system permits good-quality power supply.

Figure 11:
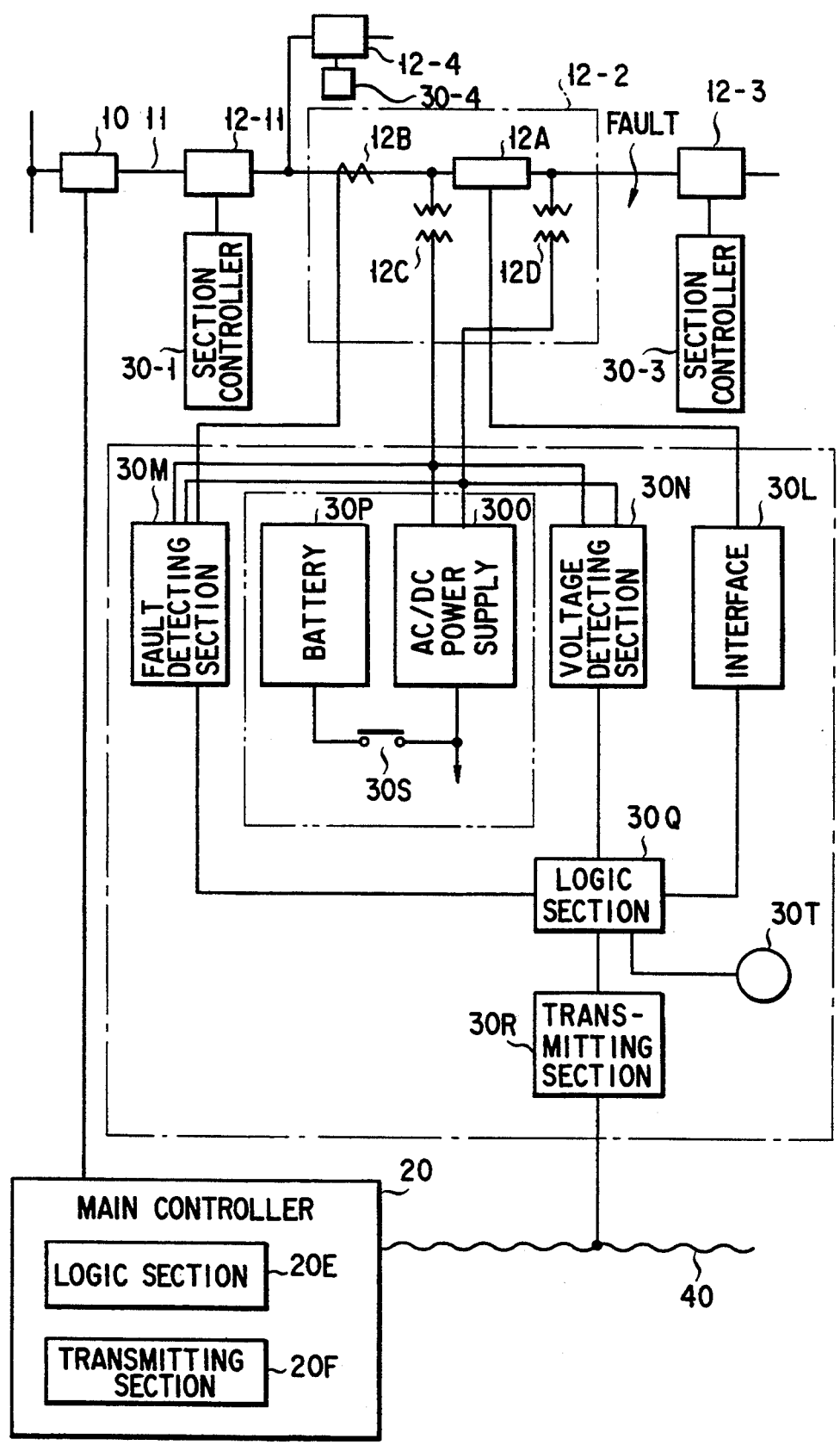
FIG. 11 is a block diagram of the section controller in the present invention.

Hereinafter, the arrangement of the section controllers will be described in detail with reference to FIGS. 11, 12 and 13. The section switches 12-1 to 12-4 are normally excited no-voltage open switches. As a typical example, the section controller 30-2 will be described in detail. As to the section controllers 30-1 to 30-4, the section controller 30-2 will be described in detail. The main controller 20 includes a logic section 20E and a transmission section 20F.

The section controller 30-2 comprises a switch element 12A, a faulty current detecting CT 12B, and transformers 12C and 12D.

The section controller 12-2 comprises an interface section 30L, a fault detecting section 30M for detecting a fault on the load side from an output of the faulty current detecting CT 12B, a voltage detecting section 30N for detecting the presence or absence of voltages on the power supply side and the load side of the section switch 12-2, an AC/DC power supply section 30O for producing a control voltage used within the controller from outputs of the transformers 12C and 12D, a normally charged battery 30P, a logic section 30Q for making information input/output decision, a transmission section 30R for communicating signals with the main controller 20, and an auxiliary relay 30T responsive to the logic section 30Q for opening or closing a contact 30S connected to the battery 30P.

FIG. 12 is a circuit diagram of the logic section 30Q for deciding fault detect information signals to be applied to the main controller 20 and deciding control of the battery 30P. In FIG. 12, 30Q1 denotes an on-delay timer. The auxiliary relay 30T is energized when the output of the voltage detecting section 30N is at VD in the presence of the line voltage and deenergized a fixed time after the output of the voltage detection section 30N becomes zero volt in the case of stoppage of power supply. The time set in the off-delay timer 30Q1 is settled to be longer than a time it takes for the main controller 20 to poll all the section controllers after change of the output of the voltage detecting section 30N from VD volts to 0 volt due to stoppage of power supply. In FIG. 12, reference character 30Q3 denotes an AND circuit, 30Q2 a storage circuit which is set by an input to its terminal S and reset by an input to its terminal R, and 30Q4 an on-delay timer.

The decision of fault detect information to be transmitted to the main controller 20 is made by an output of the fault detecting section 30M, which sets the storage circuit 30Q2. After fault detection, even if the circuit breaker 10A in the substation 10 is tripped, the storage circuit 30Q2 continues to be set, thereby transmitting a fault detect signal to the main controller 20. The storage circuit 30Q2 is reset after a lapse of the time T4 set in the on-delay timer 30Q4 from when the output of the storage circuit 30Q2 and the output Vd of the voltage detecting circuit 30N, indicating recovery of input power to the section controller, are ANDed by the AND circuit 30Q3. The time T4 set in the on-delay timer 30Q4 is settled to be longer than the time which elapses after tripping of the circuit breaker 10A due to the occurrence of a fault before the voltage detecting section 30N detects the absence of input power. Thereby, information is transmitted surely to the main controller 20 at the time of occurrence of a fault, and the storage circuit for storing fault detect information is automatically reset in the case where the fault (for example, instantaneous ground fault) is recovered before the circuit breaker 10A is tripped.

FIG. 13 is a flowchart for the operation of the logic section 20E of the main controller 20, which comprises steps 201 to 205. The main controller 20 constantly polls the section controllers to acquire fault detect information via the logic section 20E, the transmission section 20F and the transmission system 40 and monitors the section switches and fault detect signals. The main controller monitors the status of the circuit breaker 10A as well. If, in such a state, a fault occurs on the distribution line, the fault detecting section 30M will detect the fault through the faulty current detecting CT 12B to output a fault detect signal. The logic section 30Q stores fault detect information and transmits it through the transmission section 30R to the main controller 20 when polled by the main controller. Even if the circuit breaker 10A in the substation 10 is tripped by a protective relay not shown and the power supply is thus stopped in the distribution line, the fault detect information is surely transmitted from the section controller to the main controller because the fault is memorized by the section controller for a fixed time (corresponding to T3 in FIG. 12). The auxiliary relay 30T is deenergized after a lapse of the fixed time (T3 in FIG. 12), thereby opening the contact 30S. Thus, the battery 30P is disconnected from the load, preventing overdischarge of the battery. In the main controller 20, section controller information received by the transmission section 30R is decided by the logic section 30Q.

In step 201, the logic section 30Q starts to make a decision of a fault on the basis of trip information (CB trip) for the circuit breaker 10A. In step 202, information is acquired from each of the section controllers by polling after the circuit breaker is tripped. In step 203, a faulty section decision is made on the basis of the information acquired from each section controller after the circuit breaker is tripped. For example, when a fault occurs at a point shown in FIG. 11, the fault detecting section 30M in each of the section controllers 30-1 and 30-2 detects the fault, permitting the logic section 20E to produce fault detect information. The fault detect information is returned from each of the section controllers to the main controller via the transmitting section 20F and the transmission system 40 when polled by the main controller even in the absence of the section controller power supply. The section controllers 30-3 and 30-4, which are located on the load side of the faulty point, return fault non-detect information to the main controller at the time of polling. In step 203, it is decided on the basis of those pieces of information from the section controllers that the faulty point is located between the section switches 12-2 and 12-3. Thereby, the faulty section is determined. In step 204, a decision is made as to whether or not the circuit breaker 10A is reclosed by a reclosing relay not shown and then preparations are made for subsequent processing. In step 205, in order to supply electric power to normal sections before the faulty line section under the condition that the circuit breaker 10A has been reclosed, a command to close the section switch 12-1 is sent to the section controller 30-1. As a result, the switch 12-1 is closed. Reclosing of the circuit breaker 10A permits input power to be applied to the section controller 30-1. As a result, the fault detect information stored in the logic section 30Q of the section controller 30-1 is reset T2 after the control voltage VD has been obtained, and thus the normal operating state is recovered. The section controller 30-2 likewise operates to close the section switch 12-1. Where there is a loop point for another system on the load side of the faulty point, it is naturally possible to issue a closing command from the logic section 20E to the loop point and the section switch 12-4.

The fault storing logic shown in FIG. 12 is not restrictive. In place of the VD condition used to reset the storage, a reset signal may be transmitted from the main controller to the fault storing logic. Although CB trip input information is used for the section decision starting condition as shown in FIG. 13, it may be substituted by feeder fault detect information. In the above, a closing command is sent from the main controller to the section controllers for power supply to normal line sections. Alternatively, the section controllers may each have a built-in fault searching function of automatically closing their respective associated section switches after reclosing of the circuit breaker. In this case, the main controller, when it detects a faulty section, may issue a command to disable the fault searching function of a section controller adjacent to a faulty section. Moreover, in FIG. 13, the switches are closed after the circuit breaker has been reclosed by the reclosing relay. Instead of reclosing the circuit breaker by means of the reclosing relay, the main controller may issue a reclosing con, hand to the circuit breaker after a faulty section has been determined. In this case, the reclosing time can be reduced appreciably. The battery may be of a non-charged type.

Hereinafter, the control system of the present invention shown in FIG. 4 will be described.

Each of the ground fault detecting section 10B1 and the ground fault detecting section 10B2 in the substation 10 issues a fault detect signal to the main controller 20 upon detecting a ground fault or a shortcircuit fault.

As shown in FIG. 14, a main controller 200 includes at least a request signal transmitting section 200A, a fault detect signal receiving section 200B, a control signal transmitting section 200C, a faulty section determining section 200D, and a display unit 200E.

Upon receipt of a fault detect signal FD from the substation 10, the request signal transmitting section 200A sends a request signal onto the transmission system 40. In general, the request signal is transmitted simultaneously to section controllers 300-1, 300-2 and 300-3. The fault detect signal receiving section 200B receives fault detect signals sent from the section controllers 300-1 to 300-4 over the transmission system 40. The control signal transmitting section 200C sends a control signal onto the transmission system 40 after a predetermined condition is met after the transmission of the request signal.

The predetermined condition here is arrival of fault detect signals from the section controllers 300-1 to 300-3 at the main controller 200. The control signal is a first control signal that is associated with detection of a ground fault or a second control signal that is associated with detection of a short-circuit fault. The section controllers 300-1 to 300-3 operate differently depending on the type of a control signal received.

Fault detect signals produced by the section controllers 300-1 to 300-3 include a fault detect signal indicating the presence of fault and a fault detect signal indicating the absence of fault. The faulty section determining section 200D is responsive to fault detect signals from the section controllers 300-1 to 300-3 to determine one of the section switches 12-1 to 12-4 that divides the distribution line between faulty and normal sections. Information about the determined one of the section controllers is visually displayed or printed in hard copy form by the display unit 200E. The fault detect signals are transmitted from the section controllers 300-1 to 300-3 to the main controller 200 in a predetermined time sequence. That is, a request signal is simultaneously transmitted from the main controller 200 to the section controllers 300-1 to 300-3, and consequently fault detect signals are sequentially transmitted from the section controllers to the main controller at predetermined times. Alternatively, a request signal may be transmitted from the main controller to the section controllers in a predetermined polling sequence, and fault detect signals may be sequentially transmitted from the section controllers to the main controller in a predetermined polling sequence. The section controllers are identical to one another in arrangement. Thus, a description will be made of the section controller 300-1 with reference to FIG. 15. The section controller 300-1 includes at least a request signal receiving section 300A, a fault detecting section 300B, a fault detect signal transmitting section 300C, a fault detect signal receiving section 300D, a first judging section 300E, a first closing section 300F, a second Judging section 300G, a second closing section 300H, an inhibiting section 300I, a delay control section 300J, a power supply section 300K, a battery section 300L, and a switching section 300M.

The request signal receiving section 300A receives a request signal from the main controller 200 through the transmission system 40. The fault detecting section 300B detects a fault on the distribution line 11. The fault detection by the fault detecting section 300B is accomplished by detecting the presence or absence of voltages on the substation side and the load side of the section switch 12-1. When the request signal is received and the fault is detected, the fault detecting signal transmitting section 300C sends a fault detect signal to the transmission system 40. The fault detect signal receiving section 300D receives fault detect signals from the section controllers 300-2 and 300-3 other than the section controller 300-1 via the transmission system 40. The first judging section 300E judges whether or not the section switch 12-1 associated with it divides the distribution line 11 between faulty and normal line sections on the basis of the fault detect signals from the other section controllers 300-2 and 300-3. If so, the first opening section 300F issues an opening command to its associated section switch 12-1 to open it. The second Judging section 300G judges whether or not its associated section switch 12-1 is located down the faulty section on the basis of the fault detect signals from the other section controllers 300-2 and 300-3. If so, the second opening section 300H issues a closing or opening continue command to its associated section switch 12-1 to keep it closed or opened. The inhibiting section 300G inhibits the section switch 12-1 that is open from being closed until a closing-inhibit cancel command is received from outside. The delay control section 300J controls the opening operation of the first and second opening sections 300F and 300H by priority in order to open the section switch 12-1 before the circuit breaker 10A of the substation 10 is opened. The delay control section 300J can be realized by setting the operating speed of the first and second opening sections 300F and 300H and adjusting the sensitivity of the circuit breaker 10A. The power supply section 300I regulates electric power received from the distribution line 11 to a control voltage, thereby supplying power to the request signal receiving section 300A, the fault detecting section 300B, the fault detect signal transmitting section 300C, the fault detect signal receiving section 300D, the first judging section 300E, the first opening section 300F, the second judging section 300G, the second opening section 300H, the inhibiting section 300I, and the delay control section 300J through the switching section 300M. The battery section 300L, which is substituted for the power supply section 300K, converts electric power from the distribution line 11 to direct current. The switching section 300K switches between the power supply section 300K and the battery section 300L. When the section switch 12-1 is associated with the faulty line section, the battery section 300L is substituted for the power supply 300K. The battery section is charged continually or regularly.

Figure 16:
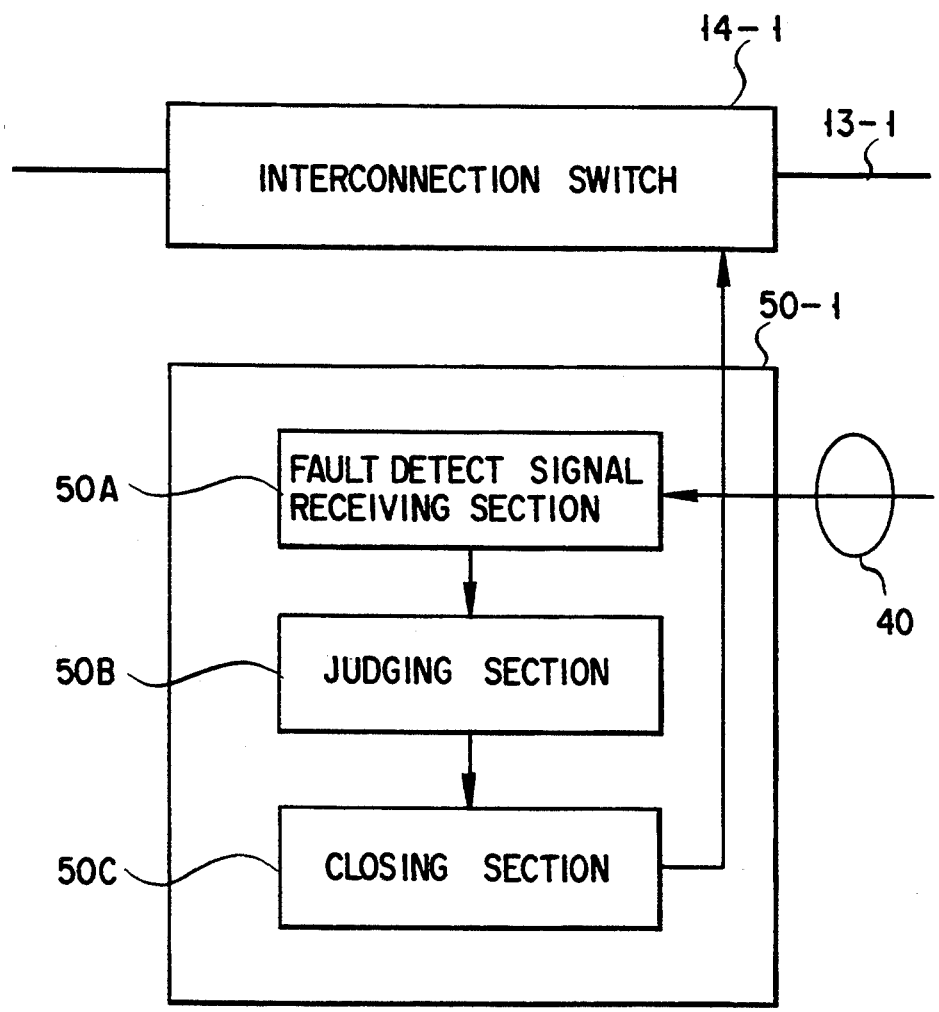
FIG. 16 is a block diagram of the interconnection controller of FIG. 4.

The interconnection controllers 50-1, 50-2 and 50-3 are identical to one another in arrangement. Thus, the interconnection controller 50-1 will be described typically with reference to FIG. 16. The controller includes at least a fault detect signal receiving section 50A, a judging section 50B, and an opening section 50C. The fault detect signal receiving section 50A receives fault detect signals from the section controllers 300-1 to 300-3 via the transmission system 4. The judging section 50B judges whether or not its associated interconnection switch 14-1 is interconnected to a non-faulty section on the basis of the fault detect signals from the section controllers 300-1 to 300-3. If so, the opening section 50C issues a closing command to the interconnection switch 14-1 to close it.

Next, reference will be made to FIG. 17 to describe another embodiment of the control system of the present invention shown in FIG. 4. Each of the section controllers 300-1 to 300-3 has a function of detecting a distribution line fault on the load side simultaneously with or more promptly than the substation 10 and a function of communicating information with the other section controllers using the transmission system (communication line) 40. Each of the interconnection controllers 50-1 to 50-3 has a function of communicating information with the section controllers 300-1 to 300-3 and the other interconnection controllers using the transmission system 40. The main controller 20 has a function of monitoring a fault detect signal FD from the substation 10 and a function of communicating information with the section controllers 300-1 to 300-3 and the interconnection controllers 50-1 to 50-3.

Figure 17:
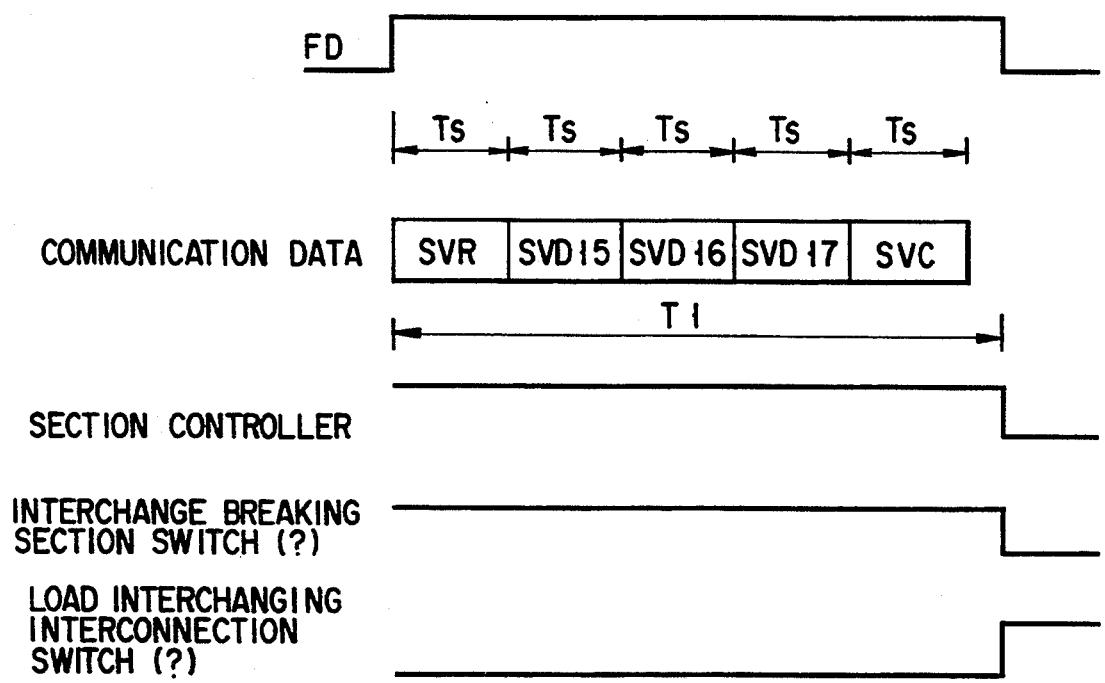
FIG. 17 is a timing chart illustrating another example of data transmission in the present invention.
Figure 23:
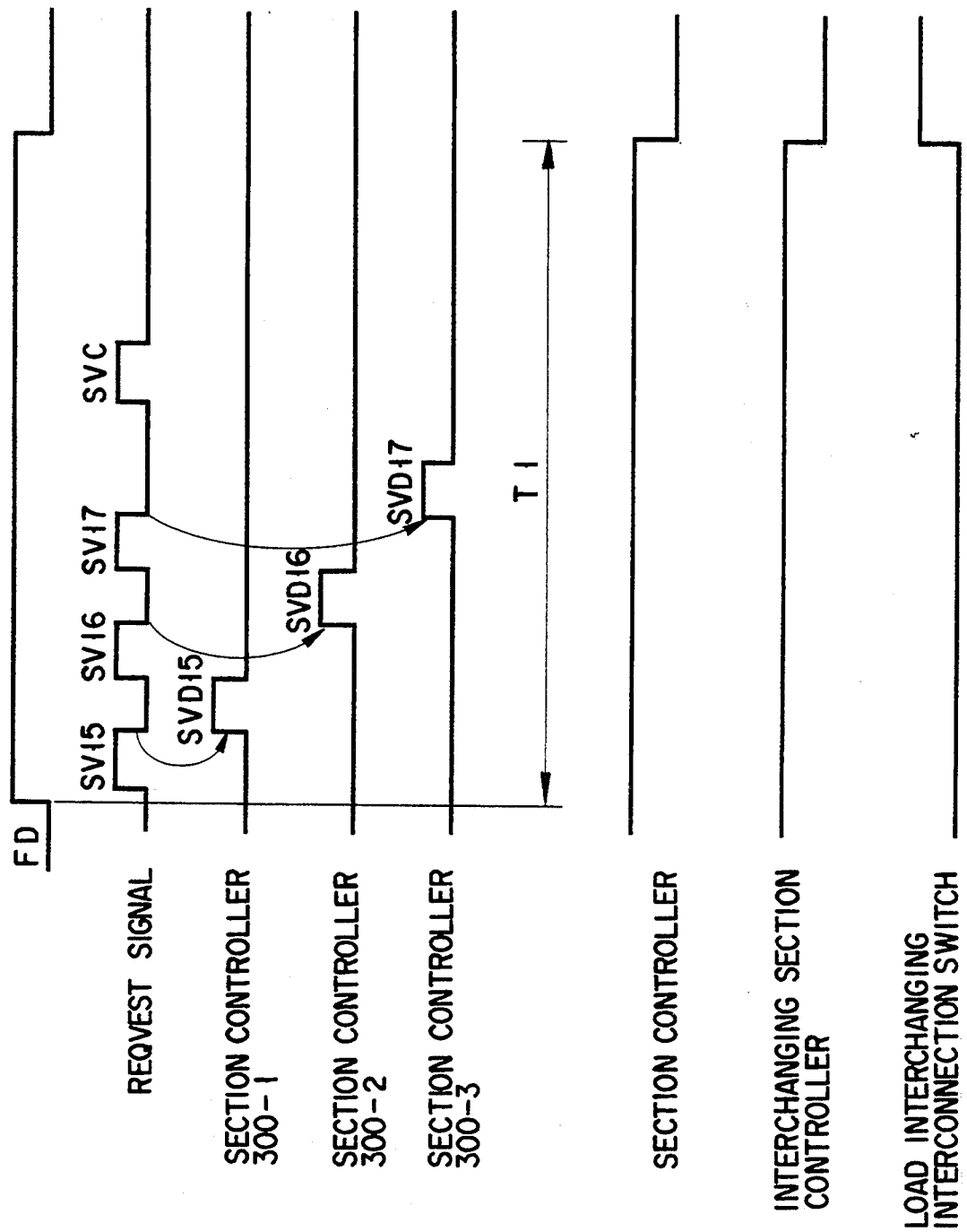
FIG. 23 is a timing chart of still another example of data transmission in the present invention.

When a fault occurs, the main controller 200 transmits a simultaneous request signal SVR and a simultaneous control signal SVC, and the section controllers 300-1 to 300-3 transmit fault detect signals SVD15 to SVD17 at the times indicated in FIG. 17. The fault detect signals SVD15 to SVD17 are transmitted at time intervals of Ts in the order of numbers of the section controllers. The setting of power-supply-side and load-side section controllers when the section controllers determine a faulty section, the setting of interchange breaking for breaking a section switch when it is located on the load side of the faulty line section, and the setting of power-supply-side section controllers when the interconnection controllers determine normal line sections on the load side are performed by the main controller 20 at the time of system operation.

Each of the section controllers determines a faulty line section and interchange breaking using logic shown in FIG. 18. If, in this case, there is no section controller on the power supply side, the determination is made as unconditionally there is fault detection on the power supply side. If there is no section controller on the load side, on the other hand, the determination is made as unconditionally there is no fault detection on the load side. The interconnection controllers determines normal line sections on the load side using logic shown in FIG. 19. The time T1 which elapses from the transmission of a simultaneous request signal from the main controller to the time when control of the section and interconnection switches terminates is selected to be shorter than the time T2 which elapses from when the substation detects a fault to the time when the circuit breaker 10A is opened.

Next, the operation will be described. It is assumed here that the section switches 12-1 to 12-3 are in the closed state, the interconnection switches 14-1 to 14-3 are in the open state, and the line sections 11-1 to 11-4 are supplied with power from the substation 10. In the section controllers 300-2 and 300-3 is previously set "interchange breaking" for opening their associated section switches when they are located on the load side of a faulty line section and preventing unintended connection between interchange electric power systems due to load interchange from another system.

If, in this state, a fault occurs in the line section 11-2, the section controller 300-1 will perform fault detection because the line fault is present on the load side. The other section controllers will not perform fault detection because the line fault is present on the power supply side of them. Next, the substation 10 also detects the line fault on the load side to send a fault detect signal FD to the main controller 20. Upon receipt of the fault detect signal FD from the substation, the main controller 20 transmits a simultaneous request signal SVR via the communication line 40. After receipt of the simultaneous request signal SVR the section controllers 300-1 to 300-4 transmit fault detect information SVD15 to SVD17 at intervals of Ts. Each of the section controllers 300-1 to 300-3 and interconnection controllers 50-1 to 50-3 receives fault detect information from other section controllers. After reception of the fault detect information SVD15 to SVD17 from the section controllers 300-1 to 300-3, the main controller 200 transmits a simultaneous control signal SVC onto the transmission system 40. Each of the controllers 30-1 to 30-3 and 50-1 to 50-3 controls its associated switch using the logic shown in FIG. 18 or FIG. 19 in accordance with the received fault detect information, in synchronism with reception of the control signal SVC. In this case, the time t1 of a controller which elapses from receipt of the simultaneous control signal to the time when its associated switch is closed is set to be shorter than the time of a controller which elapses from the receipt of the control signal to the time when its associated switch is opened. This prevents stoppage of power supply to normal line sections at the time of switching a plurality of switches.

Next, the operation of each section controller will be described. First, the section controller 300-2 controls its associated section switch 12-3 to open it by the logic of FIG. 18 including an inhibit circuit 301 and an OR circuit 302 and stores "closing inhibit" because there is unconditionally fault detection on the power supply side and the load-side section controller 300-2 performs no fault detection. The section controller 300-2 likewise opens its associated switch 12-2 and stores "closing inhibit" because the section controller 300-1 on the power supply side performs fault detection and the section controller 300-3 on the load side performs no fault detection. The section controller 300-3 opens its associated switch 12-1 because the section controller 300-2 on the power supply side performs no fault detection and "interchange breaking" is set to the inhibit circuit 302 of FIG. 18.

The interconnection controller 50-1 does not close its associated interconnection switch 14-1 by the inverter 304 because the section controller 300-1 on the power supply side is detecting fault. The interconnection controller 50-2 closes its associated interconnection switch 14-2 because the section controller 300-2 on the power supply side is not detecting fault. Likewise, the interconnection controller 50-3 closes its associated interconnection switch 14-3 because the section controller 300-3 on the power supply side is not detecting fault. The line section 11-3 is supplied with electric power by closing the interconnection switch 14-2, and the line section 11-4 is charged by closing the interconnection switch 14-3.

As described above, according to the present embodiment, good-quality power supply can be performed which disconnects only a faulty line section from a distribution line and prevents stoppage of power supply to normal line sections. In addition, stress imposed on each piece of equipment in power supply system can be reduced.

In the above embodiment, in the event of a system fault, the section controller associated with a faulty line section is opened to thereby disconnect the faulty line section from the distribution line, and, in order to prevent stoppage of power supply to normal line sections on the load side of the faulty line section, the interconnection switches associated with the normal line sections on the load side are closed for load interchange from other power systems, and unintended connection between interchange power systems is prevented. For this reason, the embodiment was described as previously setting "interchange breaking" to section switches located at abutting points between interchange power systems. However, if there is a difference in power margin between interconnection power systems and thus there is a power system incapable of load interchange, "interchange breaking" may also be set to the interconnection switches. When the "interchange breaking" is set, closing control of the interconnection switches is not performed. A change of section controllers to which "interchange breaking" is set permits interchange sections of an interconnection power system which has a margin of power to be increased. The load interchange for normal line sections on the load side of the faulty line section provides the same advantage as the previous embodiment.

In the above embodiments, switches are used for distribution-line division and interconnection. Alternatively, circuit breakers may be used. The above embodiments were described as interrupting faulty current by means of section switches. In a power system in which the interrupting capacity of the section switches is too small to interrupt short-circuit current, when a short-circuit fault occurs, the main controller may operate as follows. That is, the main controller transmits a simultaneous control signal to controllers after the circuit breaker in the substation is tripped and then each section switch is no-voltage opened. The circuit breaker in the substation is subsequently reclosed. A section switch that divides the distribution line between faulty and normal sections and a section switch that interchange-breaks will not be closed even if power supply is recovered in the state where they are open. This is because their associated section controllers are storing "closing inhibit". In this case, stoppage of power supply to normal line sections will occur once due to tripping of the substation circuit breaker for disconnection of a fault line section. In comparison with the conventional system in which power supply stoppage occurs twice, the number of power stoppage times and the stoppage time can be reduced.

The relay used in each controller may be lower in sensitivity and operating speed than the fault detecting relay in the substation. That is, each controller has a function of transmitting a signal to the main controller in the substation over the communication line in addition to a conventional function of preventing stoppage of power supply to line sections on the power supply side of a faulty line section and is equipped with a load-side fault detecting relay. The operations of the substation and each controller in this example will be described.

FIG. 21 is a block diagram of a protective relay device in the substation 10. It is assumed here that, in the control system of FIG. 3, a fault occurs on the line section 11-3 when the section switches 30-1 to 30-4 are closed to thereby effect power supply. In this case, the section controllers 30-1 and 30-2, which are located on the power supply side of the faulty line section 11-3, will detect the fault and transmit a signal indicating fault detection to the main controller 20. The other section controllers 30-3 and 30-4 will not detect the fault or transmit such a signal to the main controller. Upon receipt of the fault detect signals from the section controllers 30-1 and 30-2, the main controller 20 uses a delay timer for the condition for tripping the fault detect sections 10B1 and 10B2.

FIG. 21 is a diagram for operating the delay timer after the substation fault detecting relay tripping condition holds. The substation 10 is equipped with fault detecting sections 10B1 and 10B2, which are referred to as a relay 10B. Upon receipt of fault detect signals from the section controllers 30-1 and 30-2, the main controller 20 produces an output "1", which is inverted to "0" by a NOT circuit 305. Thus, an output "1" of the relay 10B is locked by an AND circuit 306. An AND circuit 307 produces an output "1", which starts a delay timer 308. After a lapse of a fixed time, the timer produces an output "1", which is applied through an OR circuit 309 to the circuit breaker as a tripping command.

As described above, according to the present invention, the time of tripping the circuit breaker after the operation of the relay 10B in the substation can be delayed by a fixed time and the time of tripping the section switches can be delayed. This eliminates the need of operating the fault detect relay at high speed and allows enough time for determination of a faulty line section. Thus, even if an instantaneous fault occurs which is recovered before the circuit breaker in the substation is tripped, the section controllers will not be opened unnecessarily.

Next, other embodiments will be enumerated.

Moreover, as the condition for delaying the time from the operation of the fault detecting relay in the substation until the circuit breaker is tripped, use may be made of the condition that an operation is performed between the main controller and the section controllers, permitting sure operation.

Furthermore, the operation of the fault detecting relay in the substation described so far involves tripping the circuit breaker a short time after the overvoltage ground relay (OVG) and the directional ground relay (DG) in the substation have operated, the relays being arranged to accommodate ground faults.

FIG. 22 is a block diagram in which the condition of a use decision section in the faulty line section disconnecting system is added, which is output when an operation between the main controller and the section controllers is performed. In this embodiment, only when the outputs of the main controller 20 and the use decision section 310 of the faulty line section disconnecting system are both is, the output ("1") of an AND circuit 311 permits the delay timer 308 to be started.

According to the above embodiments, each of the section switch is associated with an individual controller having communicating means, and, in the event of a fault, the time from the operation of the fault detect relay 10B in the substation 10 until the circuit breaker 10A is tripped is delayed by a fixed time. In the system for determining and disconnecting a faulty line section through controllers, therefore, it is unnecessary to operate the fault detecting relay at high speed. As the relay, a relay that is simple in construction and inexpensive can be used. In addition, since sufficient time can be taken to determine a faulty line section, even if an instantaneous fault that will be recovered before tripping of the circuit breaker occurs on the substation side, the section switches will not be opened unnecessarily.

The control system of FIG. 4 can be modified as follows. That is, although, in the above embodiment, a single simultaneous control signal is used regardless of types of faults, use may be made of two types of simultaneous control signals; a simultaneous control signal (SVC1) for ground faults, and a simultaneous control signal (SVC1) for short-circuit faults. When the main controller transmits the simultaneous control signal (SVC1) in the event of a ground fault, the time T5 it takes for a controller that has received the control signal to close its associated switch is set to be longer than the time T6 it takes for the controller to open the switch (T5>T6). This permits load interchange to be performed first so that normal line sections on the load side of the faulty line section may continue to be supplied with electric power. On the other hand, in the case of the simultaneous control signal (SVC2) for a short-circuit fault, the time T5 is set to be shorter than the time T6 (T5<T6). This prevents the short-circuit fault from extending to other power systems.

The above embodiments was described as installing the fault detecting function only in section controllers. The fault detecting function may be installed in the interconnection controllers. This permits the interconnection controllers to be used as section controllers when the power distribution system is changed.

The transmission system (communication line) described in the above embodiments may have an up-information line and a down-information line.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. For use with an electric power system including a main controller installed in a distribution substation having a circuit breaker and distribution line fault detecting means, a plurality of section controllers installed in section switches which divide a distribution line drawn out from said distribution substation into a plurality of line sections, and a transmission system for signal transmission between said main controller and said section controllers, a method of carrying out control for, when a fault occurs on said distribution line, disconnecting only a faulty line section from said distribution line, comprising:

the first step of transmitting a request signal from said main controller to said transmission system when said distribution line fault detecting means detects a fault on said distribution line;

the second step of receiving said request signal transmitted from said main controller over said transmission system by said section controllers;

the third step of detecting the fault by said section controllers;

the fourth step of transmitting to said transmission system fault detect signals indicating a fault or non fault from said section controllers which have received said request signal in the second step or performed in the third step;

the fifth step of, by each of said section controllers, receiving said fault detect signals transmitted from other section controllers over said transmission system;

the sixth step of, by each of said section controllers, Judging whether or not its associated section switch divides said distribution line between faulty and normal line sections on the basis of said fault detect signals received from said other section controllers in the fifth step; and the seventh step of, by each of said section controllers, opening its associated section switch when it is judged in the sixth step that its associated section switch is dividing said distribution line between faulty and normal line sections.

2. In an electric power system including a main controller installed in a distribution substation having a circuit breaker and distribution line fault detecting means, a plurality of section controllers installed in their associated section switches which divide a distribution line drawn out from said distribution substation into a plurality of line sections, and a transmission system for signal transmission between said main controller and said section controllers, said main controller including first means for transmitting a request signal onto said transmission system when said distribution line fault detecting means detects a fault on said distribution line, and each of said section controllers including:

second means for receiving said request signal transmitted from said main controller over said transmission system;

third means for detecting a fault on said distribution line;

fourth means for transmitting to said transmission system a fault detect signal indicating a fault or non fault when said request signal is received by said second means and said third means is performed;

fifth means for receiving said fault detect signals transmitted from other section controllers over said transmission system;

sixth means for Judging whether or not its associated section switch divides said distribution line between faulty and normal line sections on the basis of said fault detect signals from said other section controllers received by said fifth means; and seventh means for opening its associated section switch when it is Judged by said sixth means that its associated section switch is dividing said distribution line between faulty and normal line sections.

3. The system according to claim 2, in which said first means includes means for transmitting said request signal simultaneously to each of said section controllers over said transmission system, and said fourth means includes means for transmitting said fault detect signal to said other section controllers at its respective preset time.

4. The system according to claim 2, in which said first means includes means for transmitting said request signal to said section controllers in a predetermined polling sequence, and said fourth means includes means for transmitting said fault detect signal to said other section controllers in said predetermined polling sequence.

5. The system according to claim 2, in which said main controller further includes eighth means for receiving said fault detect signals from said section controllers over said transmission system and ninth means responsive to said fault detect signals received from said section controllers by said eighth means for determining one of said section switches that is indicating a faulty line in said distribution line.

6. The system according to claim 2, in which each of said section controllers further includes tenth means for inhibiting its associated section switch opened by said seventh means from being closed until a predetermined condition is established.

7. The system according to claim 2, in which said main controller further includes eleventh means for delay controlling said circuit breaker in order to open it after one of said section switches has been opened by said seventh means.

8. The system according to claim 2, in which each of said section controllers further includes twelfth means for priority controlling the opening operation of said seventh means in order to open its associated section switch before said circuit breaker opens.

9. The system according to claim 2, in which each of said section controllers further includes a battery for supplying electric power to said second through seventh means when power supply to said distribution line is stopped.

10. In an electric power system including a main controller installed in a distribution substation having a circuit breaker, distribution line ground fault detecting means and distribution line short-circuit fault detecting means, a plurality of section controllers installed in their associated respective section switches which divide a distribution line drawn out from said distribution substation into a plurality of line sections, at least one interconnection controller installed in its associated interconnection switch for interconnecting an interconnection distribution line to said distribution line, and a transmission system for signal transmission among said main controller, said section controllers and said interconnection controller, said main controller including first means for transmitting a request signal onto said transmission system when at least one of said distribution line ground fault detecting means and said distribution line short-circuit fault detecting means detects a fault on said distribution line, each of said section controllers including:

second means for receiving said request signal transmitted from said main controller over said transmission system;

third means for detecting a fault on said distribution line;

fourth means for transmitting to said transmission system a fault detect signal indicating a fault or non fault when said request signal is received by said second means and said third means is performed;

fifth means for receiving said fault detect signals transmitted from other section controllers over said transmission system;

sixth means for judging whether or not its associated section switch divides said distribution line between faulty and normal line sections on the basis of said fault detect signals from said other section controllers received by said fifth means;

seventh means for opening its associated section switch when it is Judged by said sixth means that its associated section switch is dividing said distribution line between faulty and normal line sections;

eighth means responsive to said fault detect signals from said other section controllers received by said fifth means for judging whether or not its associated section switch is located down the fault line section; and ninth means for keeping its associated section switch open or closed when said eighth means judges that its associated section switch is located down the faulty line section of said distribution line, and said interconnection section controller including:

tenth means for said fault detect signals transmitted from said section controllers over said transmission system;

eleventh means responsive to said fault detect signals received by said tenth means for judging whether or not its associated interconnection switch is interconnected to a non-faulty line section is located down the fault line section of said distribution line; and twelfth means for closing its associated interconnection switch when said eleventh means Judges that its associated interconnection switch is interconnected to a non-faulty line section is located down the fault line section of said distribution line.

11. The system according to claim 10, in which said first means further includes means for transmitting a control signal onto said transmission system when a predetermined condition is established after the transmission of said request signal, said second means further includes means for receiving said control signal, said seventh means includes means for starting opening of its associated section switch under the condition that said control signal has been received, said ninth means includes means for keeping its associated section switch open or closed under the condition that said control signal has been received, said tenth means includes means for receiving said control signal, and said eleventh means includes means for closing said interconnection switch under the condition that said control signal has been received by said means in said tenth means.

12. The system according to claim 10, in which said first means includes means for selectively transmitting a first control signal associated with the detection of a ground fault and a second control signal associated with the detection of a short-circuit fault onto said transmission system, said second means includes means for receiving said first and second control signals, said seventh means includes means for opening its associated section switch under the condition that at least one of said first and second control signals has been received by said means in said second means, said ninth means includes means for keeping its associated section switch open or closed under the condition that at least one of said first and second control signals has been received, said tenth means includes means for receiving said first and second control signals, and said eleventh means includes means for closing said interconnection switch under the condition that at least one of said first and second control signals has been received by said means in said tenth means, means for setting the time T1 required to close said interconnection switch to be shorter than the time T2 required to open said interconnection switch when said first control signal is received by said means, and means for setting the time T1 to be longer than the time T2 when said second control signal is received.

13. The system according to claim 10, in which said each of said section controllers includes a battery for supplying electric power to said second through twelfth means when power supply to said distribution line is stopped.

14. The system according to claim 10, in which at least one of said section switches and said interconnection switch comprises a circuit breaker.

15. The system according to claim 10, in which said interconnection controller further includes means for inhibiting said twelfth means from closing its associated interconnection switch even when said eleventh means judges that its associated interconnection switch is interconnected to a non-fault line section is located down the fault line section of said distribution line.

16. The system according to claim 10, in which said first means includes means for transmitting said request signal simultaneously to each of said section controllers over said transmission system, and said fourth means includes means for transmitting said fault detect signal to said other section controllers or said interconnection controller at its respective preset time.

17. The system according to claim 10, in which said first means includes means for transmitting said request signal to said section controllers in a predetermined polling sequence, and said fourth means includes means for transmitting said fault detect signal to said other section controllers or said interconnection controller in said predetermined polling sequence.

18. The system according to claim 10, in which said main controller further includes thirteenth means for receiving said fault detect signals from said section controllers over said transmission system and fourteenth means responsive to said fault detect signals received from said section controllers by said thirteenth means for determining one of said section switches that is indicating a fault line in said distribution line.

19. The system according to claim 10, in which said main controller further includes fifteenth means for delay controlling said circuit breaker in order to open it after one of said section switches has been opened by said ninth means.

20. The system according to claim 10, in which each of said section controllers further includes sixteenth means for priority controlling the opening operation of said seventh means in order to open its associated section switch by said ninth means before said circuit breaker opens.

* * * * *